(12) United States Patent
Mahal

(10) Patent No.: US 10,982,882 B2
(45) Date of Patent: Apr. 20, 2021

(54) ECO SMART PANELS FOR ENERGY SAVINGS

(71) Applicant: SIDCO Homes Inc., San Jose, CA (US)

(72) Inventor: Manmohan Singh Mahal, San Jose, CA (US)

(73) Assignee: Sidco Homes Inc., San Jose, CA (US)

( * ) Notice: Subject to any disclaimer, the term of this patent is extended or adjusted under 35 U.S.C. 154(b) by 87 days.

(21) Appl. No.: 16/276,043

(22) Filed: Feb. 14, 2019

(65) Prior Publication Data

US 2019/0249904 A1    Aug. 15, 2019

Related U.S. Application Data

(60) Provisional application No. 62/630,626, filed on Feb. 14, 2018.

(51) Int. Cl.
| | |
|---|---|
| F24S 20/60 | (2018.01) |
| F24S 80/60 | (2018.01) |
| F24S 80/70 | (2018.01) |
| F24S 25/40 | (2018.01) |
| F24S 20/67 | (2018.01) |
| F24S 60/10 | (2018.01) |
| E04C 2/52 | (2006.01) |
| F24S 20/66 | (2018.01) |
| F24S 80/00 | (2018.01) |

(52) U.S. Cl.
CPC .............. *F24S 20/60* (2018.05); *E04C 2/526* (2013.01); *F24S 20/66* (2018.05); *F24S 20/67* (2018.05); *F24S 25/40* (2018.05); *F24S 60/10* (2018.05); *F24S 80/60* (2018.05); *F24S 80/70* (2018.05); *F24D 2200/02* (2013.01); *F24S 2080/015* (2018.05); *F24S 2080/017* (2018.05)

(58) Field of Classification Search
CPC .. F24S 60/10; F24S 20/66; F24S 20/60; F24S 20/67; F24S 80/60; E04C 2/526
See application file for complete search history.

(56) References Cited

U.S. PATENT DOCUMENTS

| | | | |
|---|---|---|---|
| 4,178,727 A | 12/1979 | Johnson et al. | |
| 4,237,865 A | 12/1980 | Lorenz | |
| 4,422,443 A * | 12/1983 | Arendt | F24S 10/504 |
| | | | 126/570 |
| 5,417,023 A | 5/1995 | Mandish | |
| 9,010,040 B2 * | 4/2015 | Damo | F24S 20/66 |
| | | | 52/173.3 |

(Continued)

OTHER PUBLICATIONS

"International Search Report and Written Opinion for PCT/US2019/018108 dated Apr. 22, 2019".

*Primary Examiner* — Babajide A Demuren
(74) *Attorney, Agent, or Firm* — Wilson Sonsini Goodrich & Rosati

(57) ABSTRACT

An eco-smart panel is described comprising a a solar thermal panel, a phase change material, a metal foil layer, and a structural frame constructed of materials including wood studs, gypsum, or fiberglass-reinforced concrete. The materials may be variously configured to create modular systems for fabricating buildings or structures. Eco-smart panels may be utilized to create buildings or structure with enhanced energy efficiency, increased fire resistance, increased flood resistance, and decreased construction cost and time.

20 Claims, 25 Drawing Sheets

(56) References Cited

U.S. PATENT DOCUMENTS

| | | | |
|---|---|---|---|
| 10,605,490 B2* | 3/2020 | Juhasz | F24S 10/504 |
| 2005/0061312 A1 | 3/2005 | Szymocha | |
| 2005/0279035 A1 | 12/2005 | Donovan | |
| 2007/0235021 A1* | 10/2007 | Reed | E04D 13/031 |
| | | | 126/621 |
| 2010/0077751 A1* | 4/2010 | Vogel | F24S 40/00 |
| | | | 60/641.8 |
| 2010/0088970 A1 | 4/2010 | Miller | |
| 2011/0047908 A1 | 3/2011 | Brusman et al. | |
| 2014/0165996 A1* | 6/2014 | Sastre | F24S 80/457 |
| | | | 126/674 |
| 2014/0209270 A1* | 7/2014 | Imbabi | E04C 2/205 |
| | | | 165/56 |
| 2016/0036379 A1* | 2/2016 | Shown | A61K 31/555 |
| | | | 136/248 |
| 2017/0260738 A1 | 9/2017 | Harrison et al. | |
| 2017/0306610 A1 | 10/2017 | Leahy | |
| 2018/0224132 A1* | 8/2018 | Gonzalez | F24S 80/30 |
| 2018/0299167 A1* | 10/2018 | Miles | F24S 10/80 |
| 2018/0306466 A1* | 10/2018 | Coulter | F28F 3/04 |

* cited by examiner

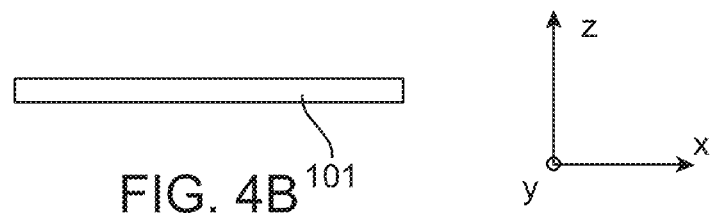
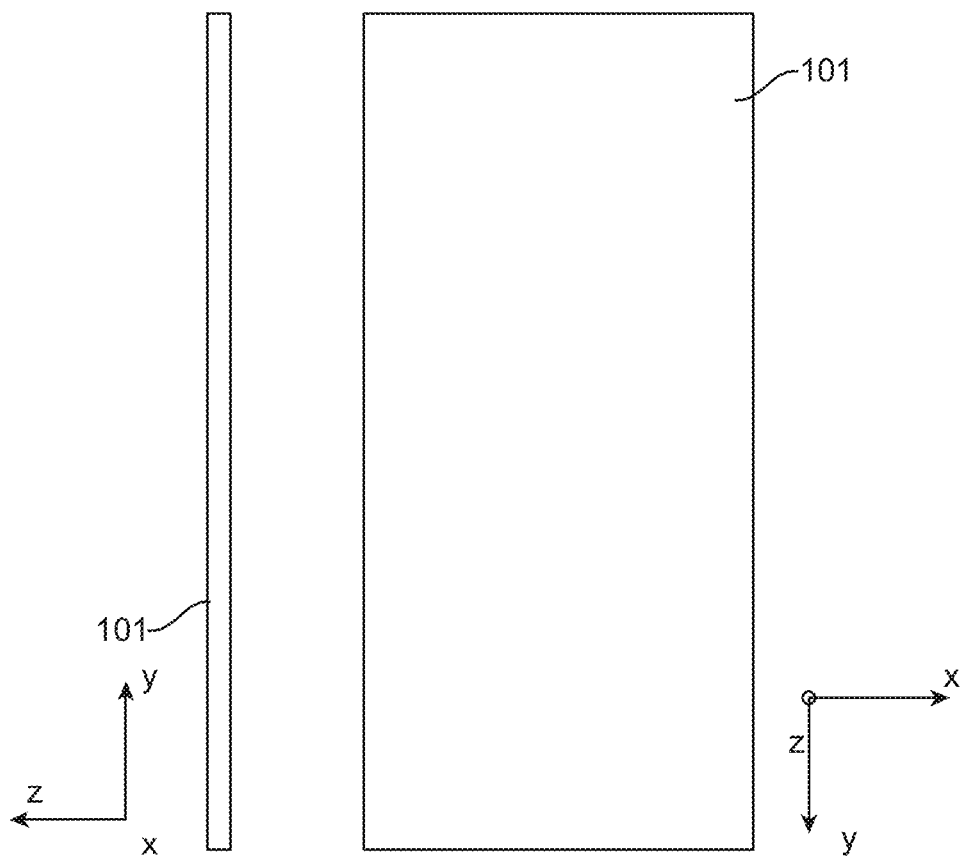
FIG. 4B
FIG. 4C  FIG. 3A

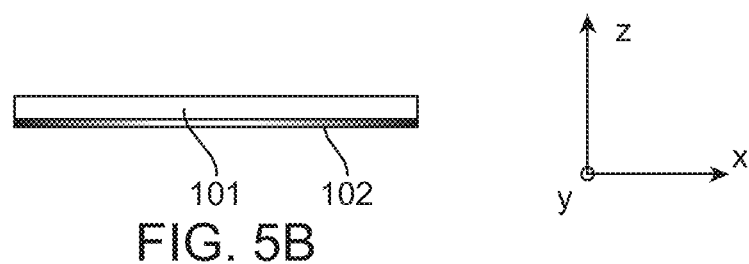
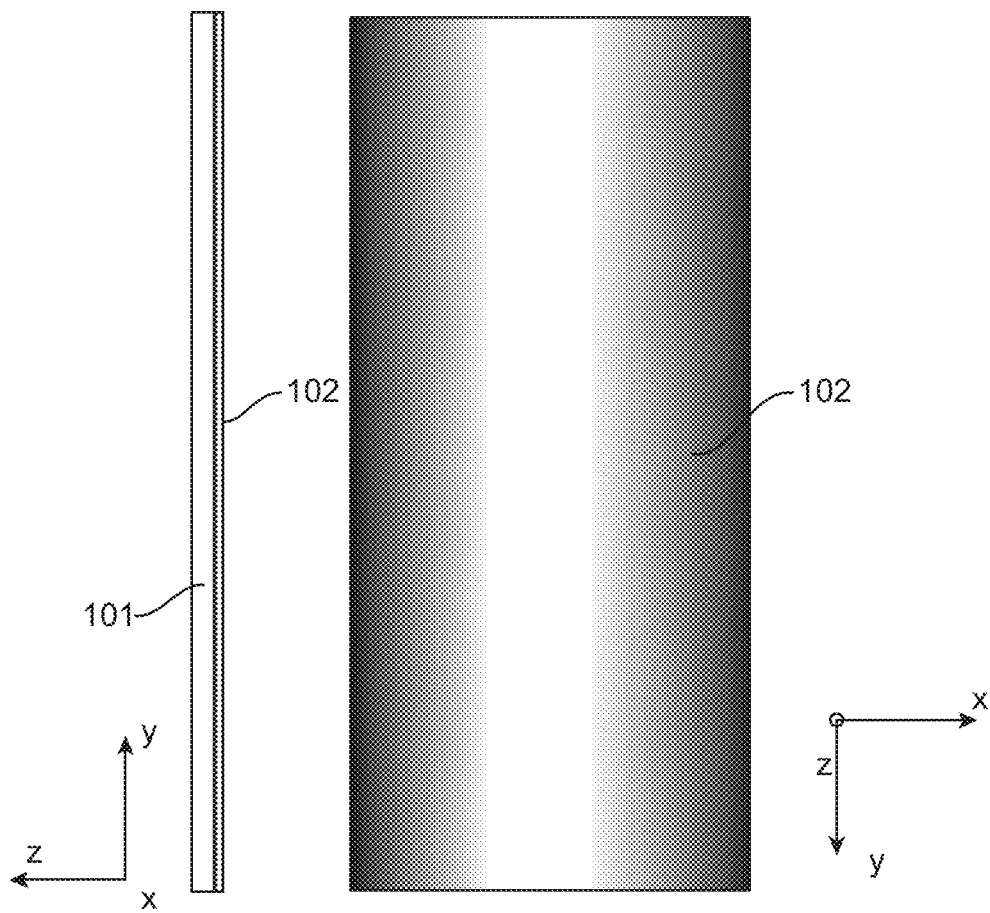
FIG. 5B
FIG. 5C  FIG. 5A

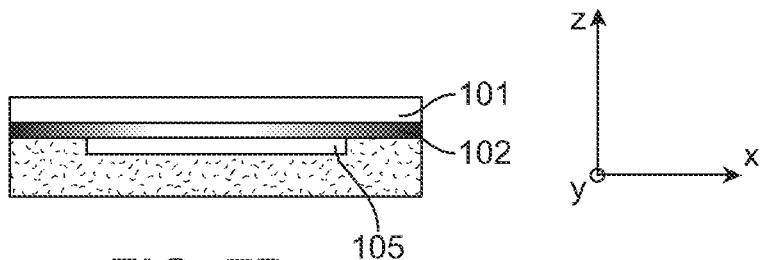
FIG. 7B
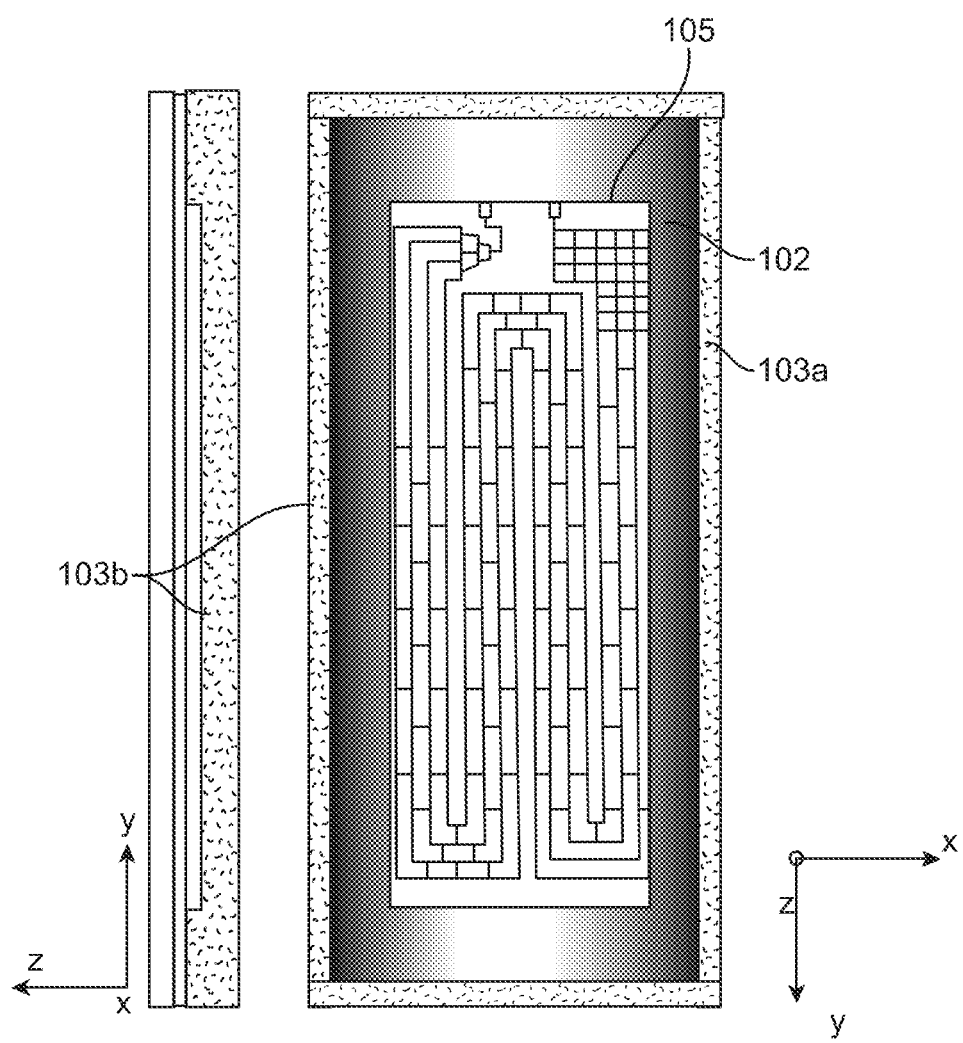
FIG. 7A
FIG. 7C

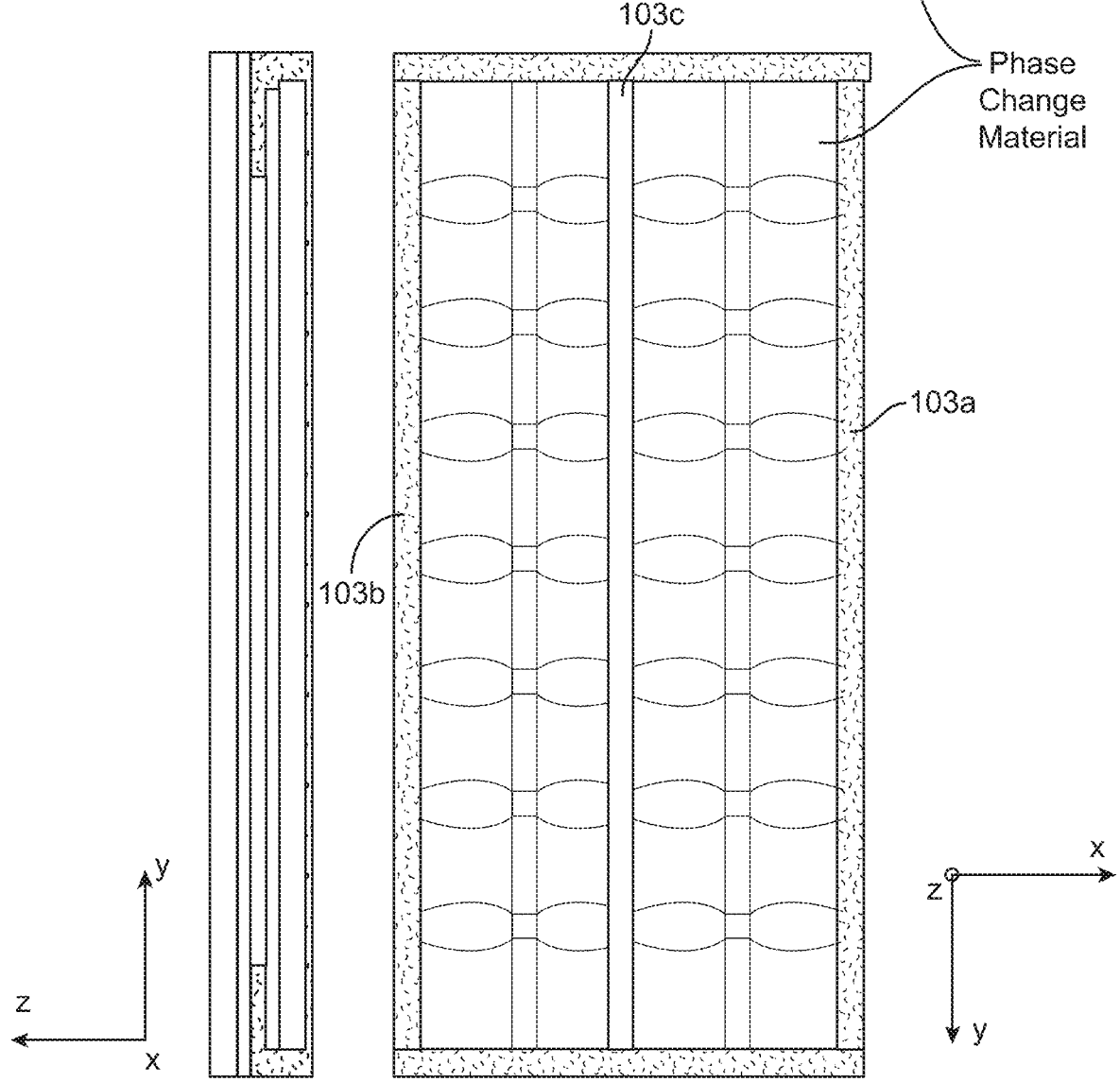

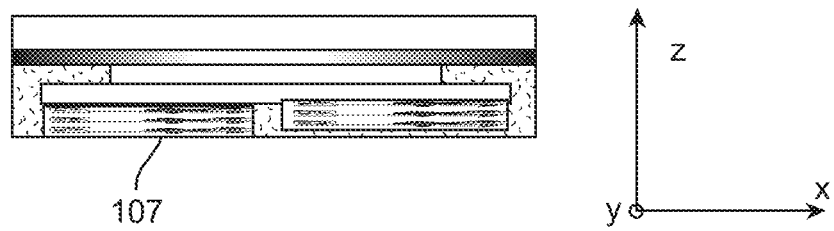
FIG. 9B
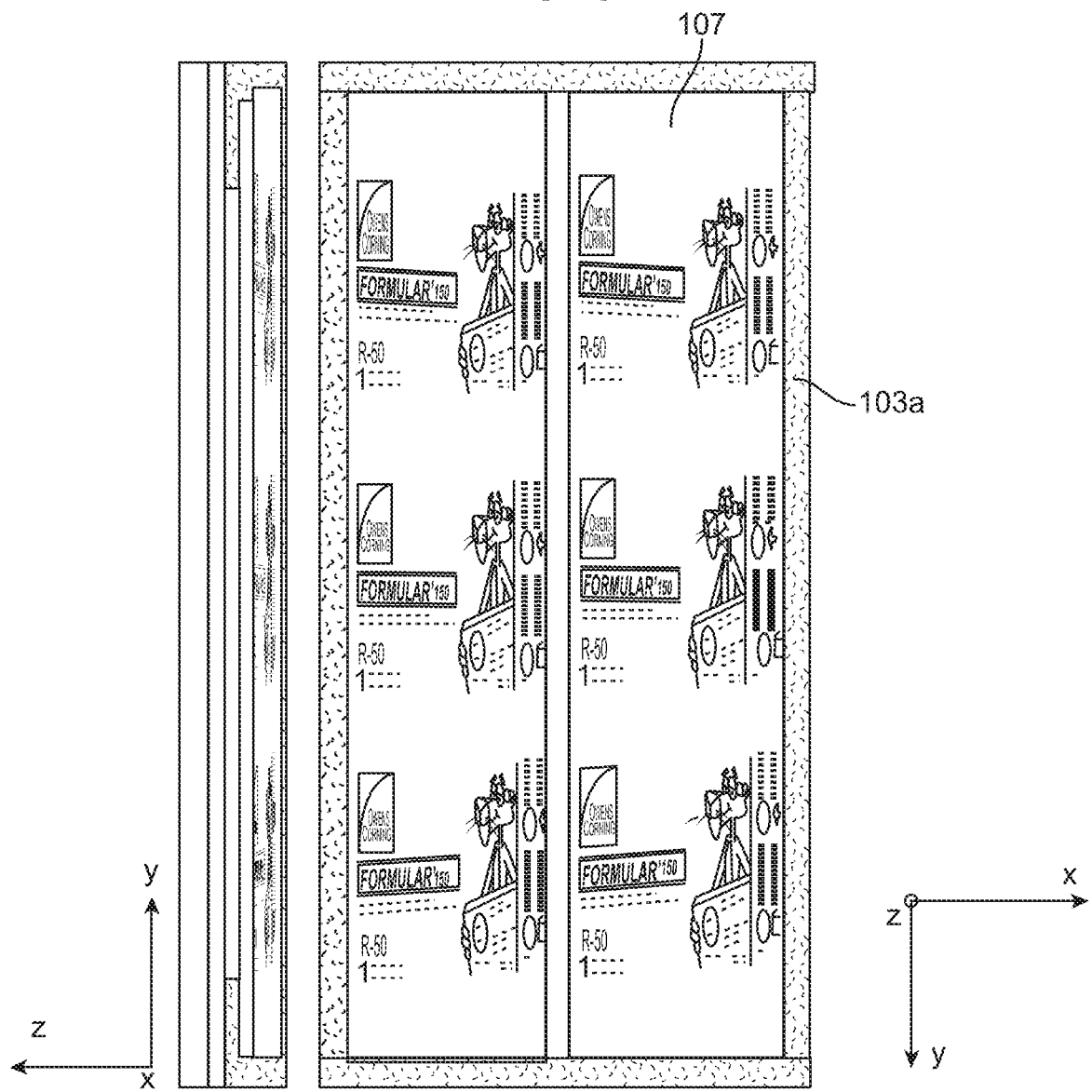
FIG. 9A
FIG. 9C

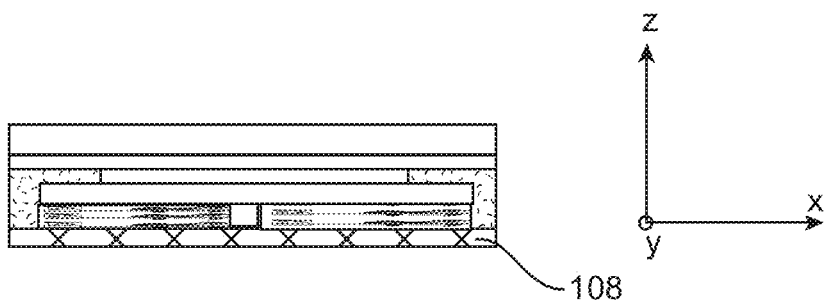
FIG. 10B
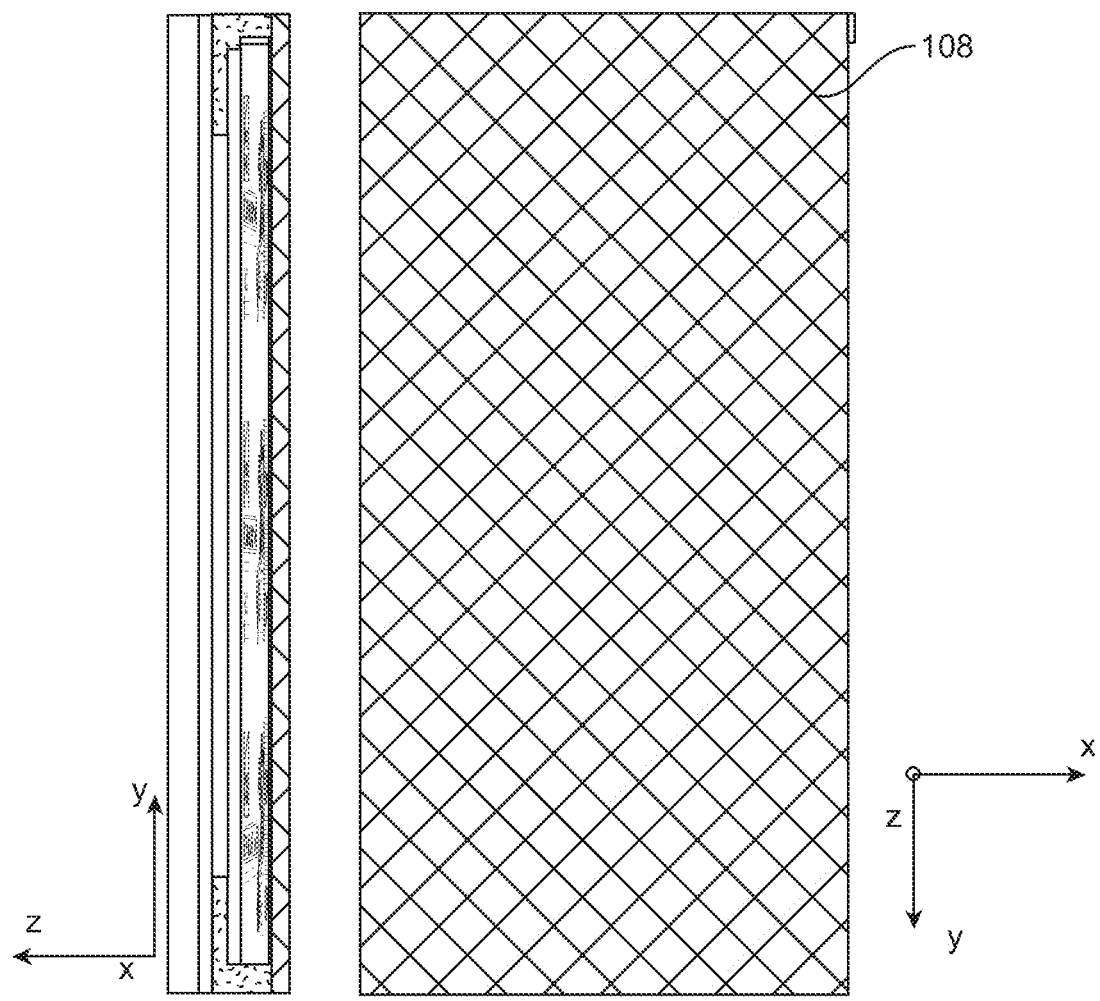
FIG. 10C
FIG. 10A

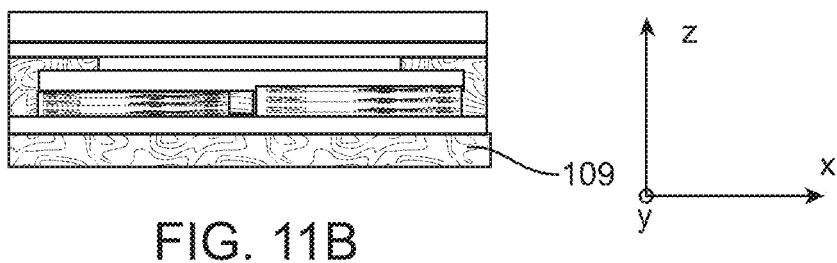
FIG. 11B
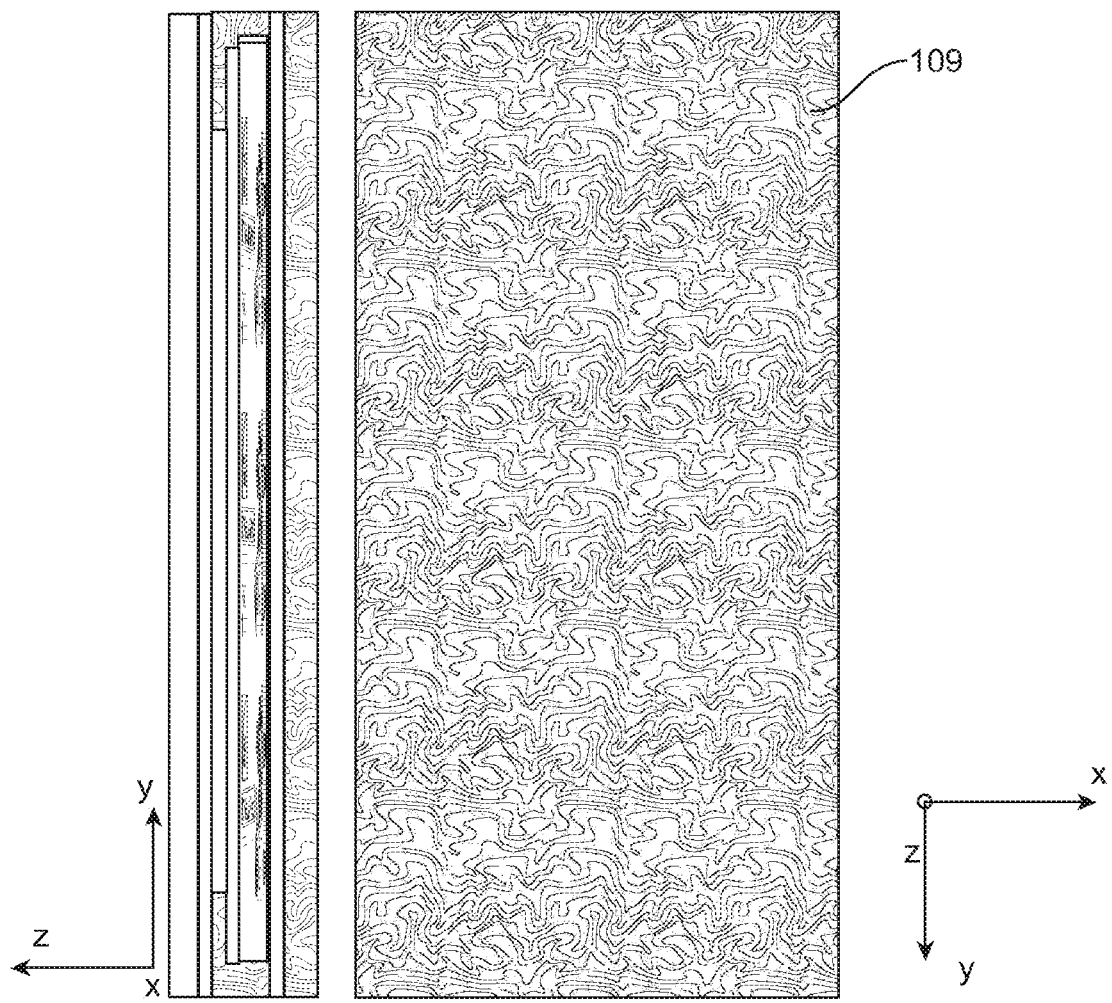
FIG. 11A
FIG. 11C

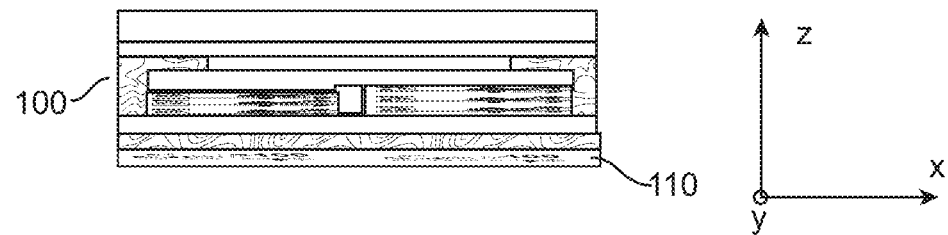
FIG. 12B
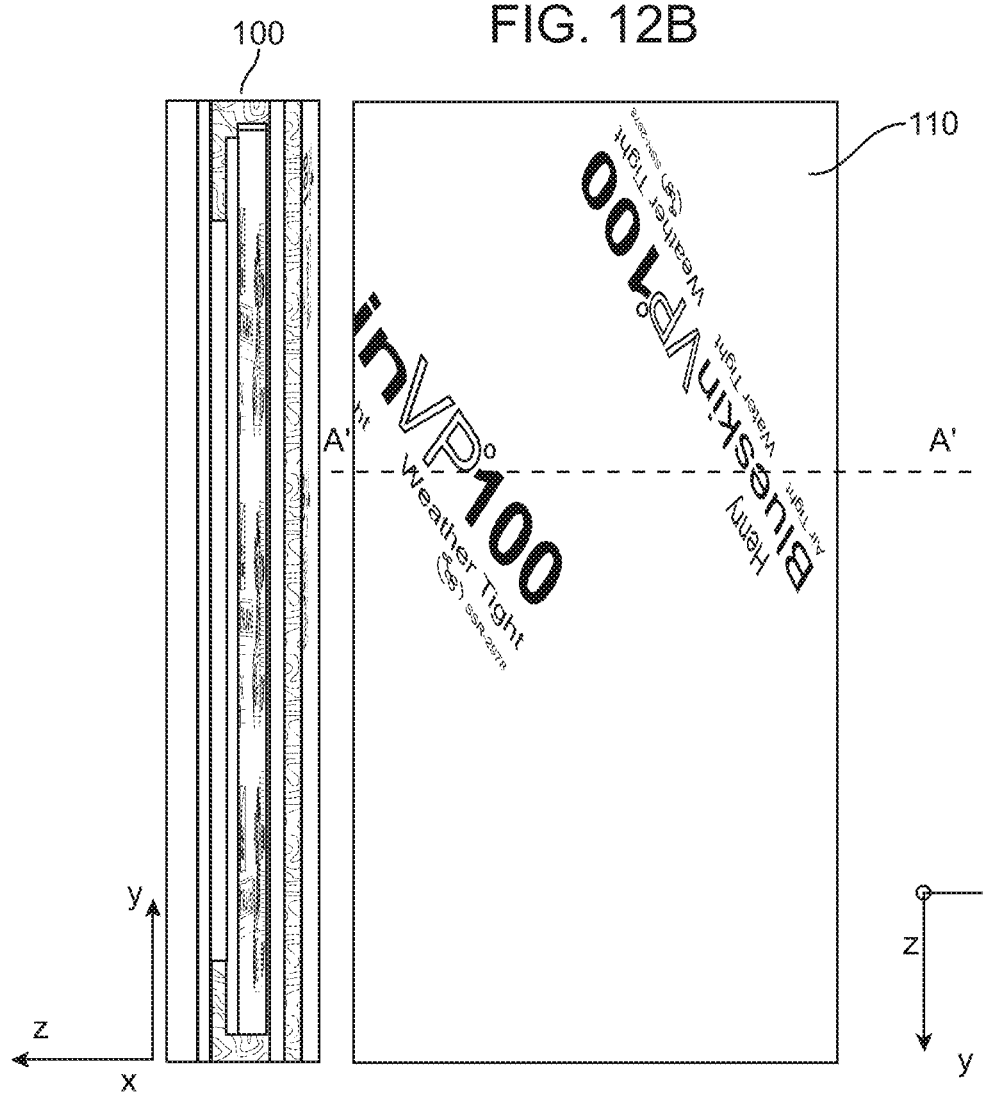
FIG. 12A
FIG. 12C

ECO SMART PANELS FOR ENERGY SAVINGS

CROSS-REFERENCE

This application claims the benefit of U.S. Provisional Patent Application No. 62/630,626, filed Feb. 14, 2018 which is incorporated herein by reference in its entirety.

BACKGROUND

Homes and commercial buildings have traditionally been built with stick frames for centuries. Heating and cooling of homes and commercial buildings may be heavily dependent on non-renewable energy generated from fossil fuels. The consumption of such energy can add up to over 20% of the total pollutants emitted in to the environment.

Measures are currently being taken to reduce the amount of pollutants emitted in to the environment. For example, to conserve non-renewable energy and reduce the generation of greenhouse gases, the state of California has set goals that all new residential buildings may be zero net energy (ZNE) by 2020 and new commercial buildings may be ZNE by 2030. In some cases, a ZNE building may be defined as a building that produces as much energy (generally through onsite renewable energy) as the building itself consumes.

SUMMARY

An eco-smart panel for meeting the goals of ZNE for residential and commercial buildings is disclosed herein. The eco smart panel can help to conserve energy and reduce energy wastage in residential and commercial buildings. Further, the eco smart panel may be capable of collecting and/or utilizing renewable energy (such as solar energy) to further reduce non-renewable energy consumption, and thereby reduce environmental pollution. The eco smart panel may reduce the cost of fabrication for buildings and structures while increasing the resistance of a structure to flooding and fire.

In some cases, an energy efficient eco smart panel may include layered materials that form at least part of a wall of a building. In some cases, an eco smart panel can be used to retrofit existing buildings. When powered with solar renewal energy, eco smart panels may be used to achieve ZNE, and provide heating and cooling to the building without the use of fossil fuels. In some cases, an eco smart panel may also provide reduction/improvement in the electromagnetic field shielding. For example, the use of thermal radiant heating and cooling metal may shield specific areas of a building to be safe and leak proof. Further, the eco smart panel may allow the wall to be protected from moisture with a vapor barrier layer of the panel. Such panel with multiple layers can be secured with an oriented strand board (OSB) to support and hold the components. The layers and elements of the panel may be attached together so that the panel can be mounted to the studs or other structural materials easily and efficiently, for example, with a snap-on clamp for saving installation time and keeping the units in place and air tight for NZE buildings. To reduce energy loss from the panel during the heating and cooling process, a phase change material (PCM) may be incorporated in to the panel. In some cases, eco smart panels may reduce up to 80% or more of energy consumption compared to conventional building panels. In some cases, the eco smart panel addresses multiple needs of the preferred passive house building methodology. In some cases, disclosed herein is a panel comprising: a drywall layer; a metal foil adjacent to the drywall layer; a stud, gypsum, or fiberglass-reinforced concrete frame adjacent to the metal foil, wherein the frame is affixed to the drywall layer and/or the metal foil. In some cases, the frame comprises one or more openings, one or more solar thermal panels positioned at least partly within the one or more openings of the frame, and one or more enclosures adjacent to the one or more thermal panels. In some cases, the one or more enclosures are configured to hold a phase change material therein, where the one or more enclosures are at least partly located within one or more openings, and a foam layer adjacent and attached to at least one of the frame or more enclosures, an electromagnetic shielding layer, an oriented strand board layer adjacent to the electromagnetic shielding layer, a barrier layer attached to the oriented strand board layer. In some cases, the barrier layer is substantially impermeable to one or more of air, vapor, moisture, or water.

In some cases, the panel disclosed herein may further comprise one or more sensors configured to collect environmental data surrounding the panel. In some cases, the one or more sensors may be remotely controlled by a user device. In some cases, the panel may further comprise a controller that is configured to control the one or more solar thermal panels or the one or more sensors based on the environmental data. In some cases, the one or more sensors may comprise Internet-of-Things sensors. In some cases, the one or more sensors are located on or within the drywall layer. In some cases, the one or more sensors comprises one or more of a temperature sensor, a humidity sensor, an air flow sensor, a pressure sensor, a carbon monoxide sensor, a carbon dioxide sensor, an acoustic sensor, or a vibration sensor. In some cases, the drywall layer comprises a gypsum board. In some cases, the one or more enclosures comprise a thermal conductive material. In some cases, the one or more enclosures comprise Aluminum. In some cases, the foam layer is configured to mechanically support the enclosures and/or the solar thermal panels. In some cases, the dry wall layer is about 0.5 inch thick. In some cases, the stud frame comprises a thickness in a range of about 1 inch to about 5 inches. In some cases, the Aluminum foil is attached to at least one of the drywall layer, the stud frame, or the solar thermal panel. In some cases, the one or more solar thermal panels is at least partly attached to one or more of the stud frame or the metal foil. In some cases, the one or more enclosures is at least partly attached to one or more of the solar thermal panels or the stud frame. In some cases, the foam layer is at least partly attached to one or more of the enclosures or the structural frame. In some cases, the foam layer is substantially rigid. An aspect of the present disclosure is directed to a fabricated panel. The fabricated panel may comprise: a) one or more solar thermal panels, b) a phase change material, c) a metal foil layer, and d) a structural material. The one or more solar thermal panels may be connected to the structural material, and the phase change material and metal foil layer may be in contact with the one or more thermal panels. The incorporation of one or more of the fabricated panels into a structure may allow the thermal energy consumption of the structure to be reduced by at least about 10% compared to a structure that does not incorporate these panels.

In some embodiments, the fabricated panel may further comprise one or more materials selected from the group consisting of: a) drywall, b) insulating material, c) vapor barrier material, d) oriented strand board, and e) electromagnetic shielding material.

In some embodiments, the fabricated panel may further comprise one or more sensors configured to collect environmental data surrounding the fabricated panel. In some embodiments, the fabricated panel may comprise one or more sensors that are remotely controlled by a user device. In some embodiments, the fabricated panel may further comprise a controller that controls the one or more solar thermal panels or the one or more sensors based on the environmental data. In some embodiments, the fabricated panel may comprise one or more sensors that comprise Internet-of-Things sensors. In some embodiments, the fabricated panel may comprise one or more sensors that are located on or within the drywall layer. In some embodiments, the fabricated panel may comprise one or more sensors selected from the group consisting of a temperature sensor, a humidity sensor, an air flow sensor, a pressure sensor, a carbon monoxide sensor, a carbon dioxide sensor, an acoustic sensor, and a vibration sensor.

In some embodiments, the fabricated panel may comprise one or more solar thermal panels that are oriented toward an exterior surface of the structure. In some embodiments, the fabricated panels may comprise one or more solar thermal panels that are oriented toward an interior surface of the structure. In some embodiments, the fabricated panel may comprise an exterior wall of the structure. In some embodiments, the fabricated panel may comprise an interior wall of the structure. In some embodiments, the fabricated panel may comprise a ceiling of the structure.

In some embodiments, the fabricated panel may comprise a structural material that comprises one or more wood studs. In some embodiments, the fabricated panel may comprise one or more wood studs that are of a nominal size selected from the group consisting of: 1×2, 1×3, 1×4, 1×6, 1×8, 1×10, 1×12, 2×2, 2×3, 2×4, 2×6, 2×8, 2×10, 2×12, 4, ×4, 4×6, and 4×8. In some embodiments, the fabricated panel may comprise a structural material that comprises concrete. In some embodiments the fabricated panel may comprise concrete that contains a weight-reducing component. In some embodiments, the fabricated panel may comprise a weight-reducing component that comprises fiberglass.

In some embodiments, the fabricated panel may comprise an insulating material that comprises rigid polystyrene foam. In some embodiments, the fabricated panel may comprise an insulating material that comprises fiberglass. In some embodiments, the fabricated panel may have an insulating R-value of at least about 10. In some embodiments, the fabricated panel may have an insulating R-value of at least about 20.

In some embodiments, the incorporation of the one or more panels into the structure reduces the thermal energy consumption of the structure by at least about 20%. In some embodiments, the incorporation of the one or more panels into the structure reduces the total energy consumption of the structure by at least about 10%.

In some embodiments, the fabricated panel may further comprise a void space. In some embodiments, the fabricated panel may comprise a void space that comprises a plumbing component, an electrical component, or a telecommunications component.

In some embodiments, a structure may comprise one or more fabricated panels, where the fabricated panels comprise: a) one or more solar thermal panels, b) a phase change material, c) a metal foil layer, and d) a structural material, where the one or more solar thermal panels are connected to the structural material, and the phase change material and metal foil layer are in contact with the one or more fabricated panels and where the incorporation of the one or more fabricated panels into the structure reduces the thermal energy consumption of the structure by at least about 10%.

In some embodiments, the structure may comprise one or more fabricated panels that have an insulating R-value of at least about 10. In some embodiments, the structure may comprise one or more fabricated panels that have an insulating R-value of at least about 20.

In some embodiments, the structure may comprise one or more fabricated panels that reduce the thermal energy consumption by at least about 20%. In some embodiments, a space in the structure may experience a passive interior temperature differential of no greater than about 20° C.

In some embodiments, the structure may comprise one or more fabricated panels that may further comprise at least one material selected from the group consisting of: a) drywall, b) insulating material, c) vapor barrier material, d) oriented strand board, and e) electromagnetic shielding material.

In some embodiments, the structure may further comprise one or more sensors configured to collect environmental data surrounding the one or more fabricated panels. In some embodiments, the structure of may comprise one or more sensors that are remotely controlled by a user device. In some embodiments, the structure may further comprise a controller that controls the one or more solar thermal panels or the one or more sensors based on the environmental data. In some embodiments, the structure may comprise one or more sensors that comprise Internet-of-Things sensors. In some embodiments, the structure may comprise one or more sensors that are located on or within the drywall layer. In some embodiments, the structure may comprise one or more sensors selected from the group consisting of a temperature sensor, a humidity sensor, an air flow sensor, a pressure sensor, a carbon monoxide sensor, a carbon dioxide sensor, an acoustic sensor, and a vibration sensor.

In some embodiments, the structure may comprise one or more fabricated panels that are pre-fabricated. In some embodiments, the structure may comprise one or more fabricated panels that are assembled in a modular fashion. In some embodiments, the structure is assembled in no greater than about 1 month. In some embodiments, the structure is assembled in no greater than about 2 weeks.

In some embodiments, a method of constructing a pre-fabricated panel may comprise providing a structural material with at least one void space and coupling one or more outer layers to the structural material. In some embodiments, a method of constructing a fabricated panel may comprise inserting a solar thermal panel into the at least one void space and coupling the solar thermal panel to the structural material. In some embodiments, a method of constructing a fabricated panel may comprise inserting a phase change material into the at least one void space and coupling the phase change material to the solar thermal panel.

In some embodiments, a method of constructing a fabricated panel may comprise providing a structural material in which the structural material comprises wood studs or concrete. In some embodiments, a method of constructing a fabricated panel may comprise providing one or more outer layers in which an outer layer may comprise metal foil, drywall, or oriented strand board. In some embodiments, a method of constructing a fabricated panel may comprise inserting a solar thermal panel in which the solar thermal panel is directly contacted to a metal foil layer. In some embodiments, a method of constructing a fabricated panel may further comprise inserting at least one material into the at least one void space. The at least one material may be selected from the group consisting of i) insulation, ii) shielding, and iii) barrier material.

In some embodiments, a method of fabricating a structure comprises: a) fabricating one or more modular panels, and b) connecting the one or more modular panels to form a structure. In some embodiments, the modular panels comprise: a) one or more solar thermal panels, b) a phase change material, c) a metal foil layer, and d) a structural material. In some embodiments, the one or more solar thermal panels are connected to the structural material, and the phase change material and metal foil layer are in contact with the one or more thermal panels. In some embodiments, the incorporation of one or more of the modular panels into the structure reduces the thermal energy consumption of said structure by at least about 10% compared to a structure without the panels.

It shall be understood that different aspects of the disclosure can be appreciated individually, collectively, or in combination with each other. Various aspects of the disclosure described herein may be applied to any of the particular applications set forth below or for any other types of systems and methods for manipulating materials to form 3D structures, or for transportation or assembly of components.

Other objects and features of the present disclosure will become apparent by a review of the specification, claims, and appended figures.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the disclosure are set forth with particularity in the appended claims. A better understanding of the features and advantages of the present disclosure will be obtained by reference to the following detailed description that sets forth illustrative embodiments, in which the principles of the disclosure are utilized, and the accompanying drawings of which:

FIG. 4A illustrates an example of a layer of the eco smart panel disclosed herein, in this case, a drywall layer.

FIGS. 4B-4C illustrate the cross sections of the drywall layer in FIG. 4A, in accordance with some embodiments.

FIG. 5A illustrates an example of a layer of the eco smart panel disclosed herein, in this case, a layer of metal foil that may be attached on the drywall layer of FIG. 4 or any other layer of the ESP.

FIGS. 5B-5C illustrate the cross sections of the metal foil layer in FIG. 5A, in accordance with some embodiments.

FIG. 7A illustrates an example of a layer of the eco smart panel disclosed herein, in this case, a layer of one or more solar thermal panel(s) that may be attached on the drywall and/or foil layer of FIG. 6 or any other layer of the ESP.

FIGS. 7B-7C illustrate the cross sections of the solar thermal panel(s) in FIG. 7A, in accordance with some embodiments.

FIG. 8A illustrates an example of a layer of the eco smart panel disclosed herein, in this case, a layer of phase change material (PCM) within one or more enclosures that may be attached on the solar thermal panel(s) of FIGS. 7A-7C or any other layer of the ESP.

FIGS. 8B-8C illustrate the cross sections of PCM in FIG. 8A, in accordance with some embodiments.

FIG. 9A illustrates an example of a layer of the eco smart panel disclosed herein, in this case, a layer of insulation foam that may be attached on the layer of phase change material (PCM) of FIGS. 8A-8C or any other layer of the ESP.

FIGS. 9B-9C illustrate the cross sections of insulation foam in FIG. 9A, in accordance with some embodiments.

FIG. 10A illustrates an example of a layer of the eco smart panel disclosed herein, in this case, a layer of EMF shielding material that may be attached on the layer of oriented strand board (OSB) or any other layer of the ESP.

FIGS. 10B-10C illustrate the cross sections of the EMF shielding material in FIG. 10A, in accordance with some embodiments.

FIG. 11A illustrates an example of a layer of the eco smart panel disclosed herein, in this case, a layer of oriented strand board.

FIGS. 11B-11C illustrate the cross sections of the OSB layer in FIG. 11A, in accordance with some embodiments.

FIG. 12A illustrates an example of a layer of the eco smart panel disclosed herein, in this case, a layer of air and vapor barrier that may be attached on the layer of oriented strand board or any other layer of the ESP.

FIG. 12B-12C illustrate the cross sections of the barrier layer in FIG. 12A, in accordance with some embodiments.

DETAILED DESCRIPTION

Figure 1:
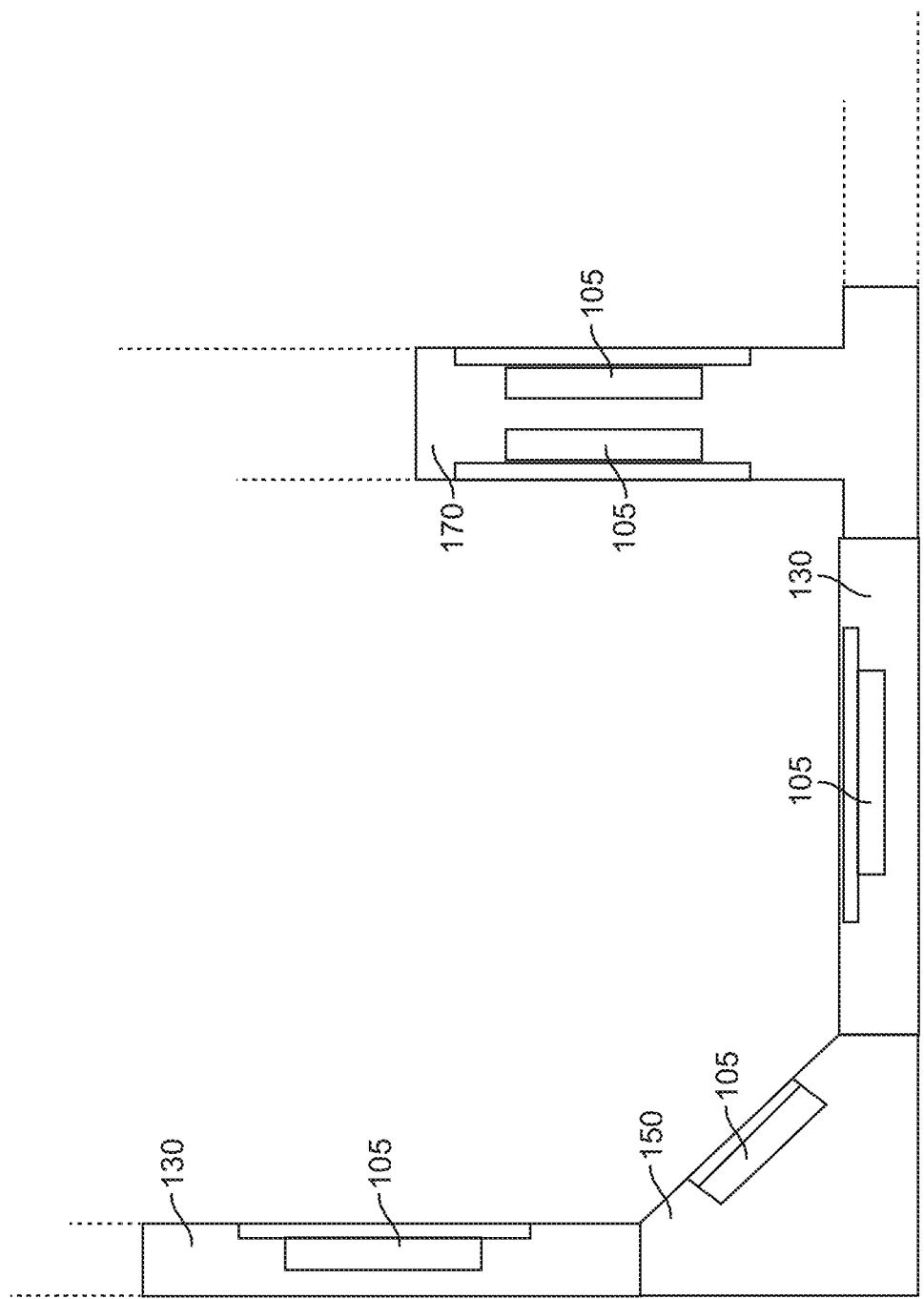
FIG. 1 depicts a top-down cross-section of a room constructed from eco smart panel (ESP) in a modular configuration, in accordance with some embodiments.

Reference will now be made in detail to exemplary embodiments of the disclosure, examples of which are illustrated in the accompanying drawings. Wherever possible, the same reference numbers will be used throughout the drawings and disclosure to refer to the same or like parts.

Disclosed herein are eco smart panels (ESP) in accordance with various embodiments. An ESP may include a combination of multiple layers. The layers may serve various purposes, including insulation, electromagnetic field (EMF) shielding or other types of shielding, vapor-resistance, structural support, fire-resistance, and durability. In some cases, the multiple layers, after combination, may include one or more specific orders of the layers. In some cases, the combination, connection, coupling or attachment of multiple layers herein may use screws, adhesive, or any other mechanical and/or chemical fastening elements and/or methods. The material systems disclosed herein may be used as building materials for a wide range of structures and systems. The materials may be used both as exterior building materials and interior building materials. Specific configurations of layering may be used for particular purposes, e.g. a highly water-resistant configuration for exterior walls in a humid, rainy, or flood-prone region. ESPs may be designed for and deployed in to virtually any environment, including arctic, subarctic, temperate coastal areas, desert, and tropical regions. ESPs may be assembled during fabrication of a building or structure, or may be pre-fabricated and assembled in a modular fashion. Modular, pre-fabricated ESPs may permit the rapid construction of energy efficient buildings and structures at a substantial cost savings in a wide range of environments. Buildings or structures built with ESPs may meet the standards of any applicable building codes or building initiatives and may permit the construction of structures that have minimal or net zero energy consumption.

In some cases, the ESP may enable optimal energy saving (e.g., saving in the range of about 10% to about 90% of the total energy used) in residential and/or commercial buildings by a combination of reducing wastage of energy (e.g., obtaining optimal R-Value using specific combination of materials in particular orders) and active energy generation. An R-value may be defined as the thickness of a particular material divided by its apparent thermal conductivity. The optimal R-Value may include but is not limited to the range of R-10 to R-60. The ESP may reduce wastage of energy by providing reflection of energy. The ESP may provide the functionality for active heating and cooling. For example, such heating and cooling may be radiated from an Aluminum sheet connected to a heat pump or a cooling device. A heat pump or cooling device may use renewable energy generated by elements within the ESP, such as a solar thermal panel. In some cases, the ESP herein can provide fire resistance capabilities to the buildings. In some cases, the ESP may enable passive control of moisture.

Figure 2:
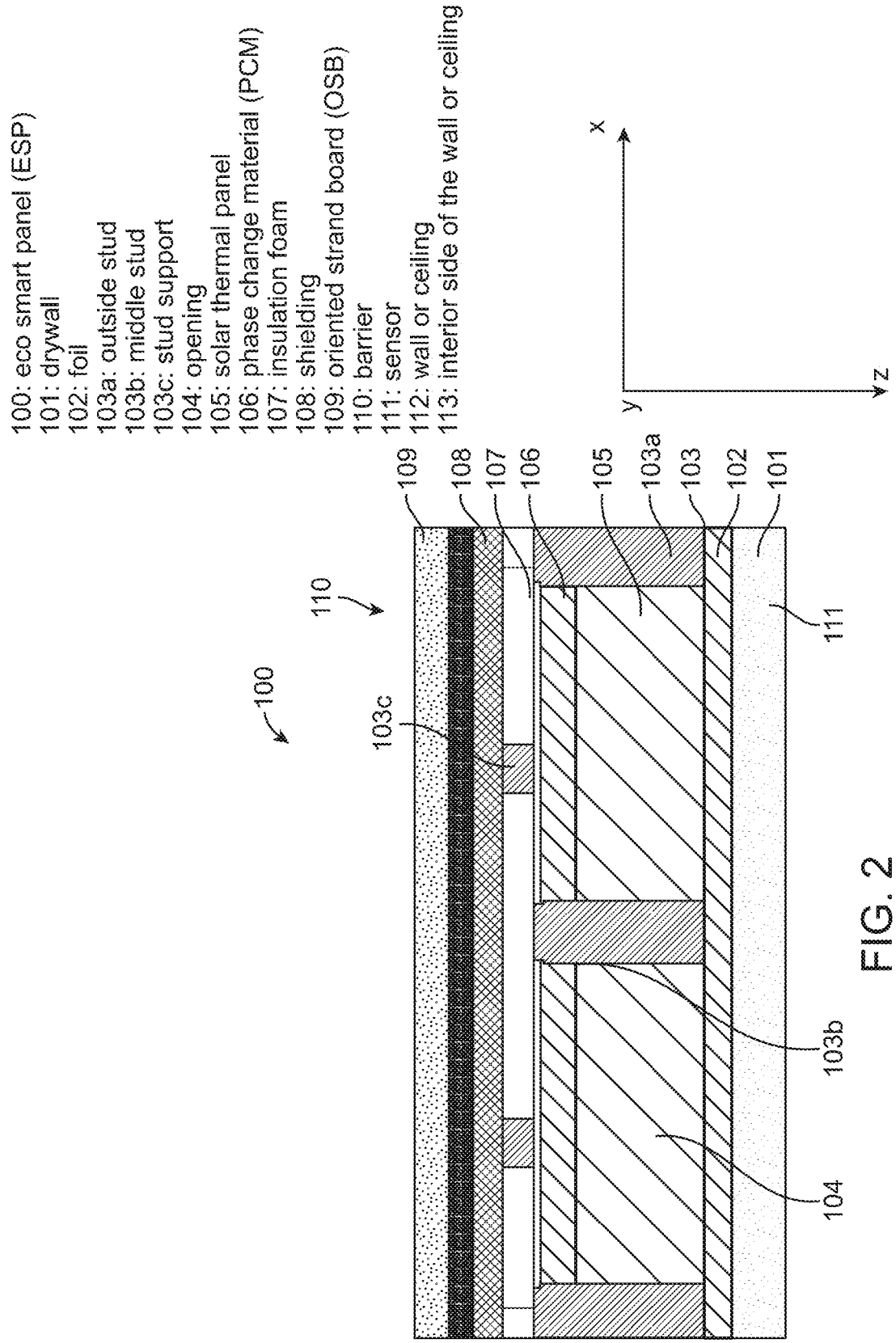
FIG. 2 illustrates a schematic cross-section of an ESP disclosed herein.

FIG. 1 schematically depicts an exemplary room assembled from various connected ESPs. An angled corner ESP 150 may be joined to two flat wall ESPs 130. A tee ESP 170 may form at least a portion of a rightward wall. FIG. 2 illustrates an ESP 100 shown in cross-section at A-A' of FIG. 12A, in accordance with some embodiments. The panel may comprise multiple layers 101 through 110 which include an outermost layer on each end. Any number of layers in a panel may be contemplated. In some embodiments, a sheet rock layer 101 can be configured to face an interior of a residential or commercial building. A barrier layer 110 can be configured to face an exterior of a residential or commercial building.

The enclosure depicted in FIG. 1 demonstrates how an ESP may be utilized to assemble a building or structure in a modular fashion. The enclosure of FIG. 1 may be a building or structure that contains a single room. In some cases, a modular ESP system can be used to create buildings or structures with multiple rooms. An ESP may act as a wall for more than one room. Modular ESP systems may contain additional joining elements to unite wall and ceiling panels. Joining elements may comprise corners, joints, angles, steps, or any other element necessary to create a building or structure. A joining element may be constructed to contain a solar thermal panel, such as the angled corner 150 shown in FIG. 1. In some cases, an ESP may be configured at its edges or boundaries to contain one or more elements or components that permit the ESP to contact, connect, or mate with another ESP to aid in the assembly of structures from the ESPs.

Figure 13:
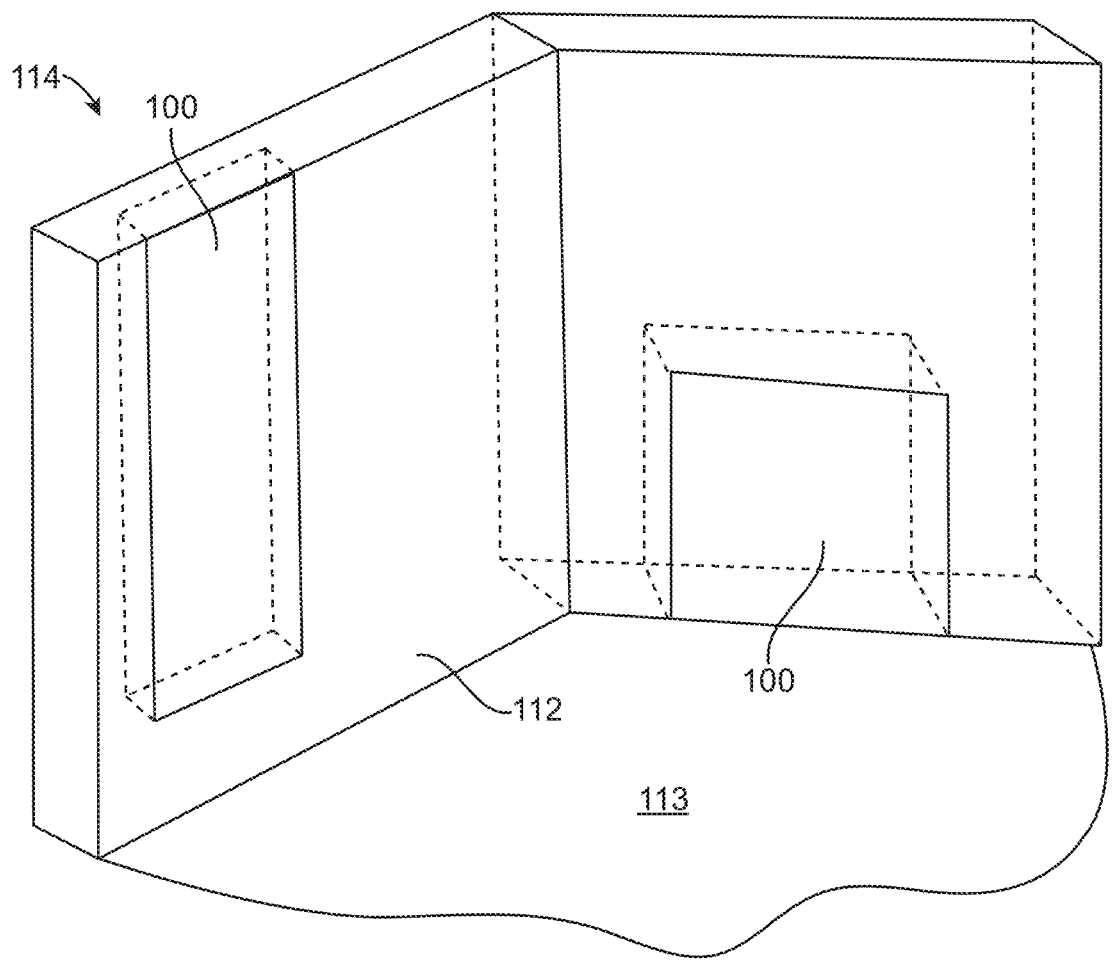
FIG. 13 illustrates a schematic view of the eco smart panel disclosed herein installed in a wall or roof of a building.

FIG. 13 illustrates an ESP 100 installed in a wall 112 or a ceiling of a building, in accordance with some embodiments. The panel may be installed so that the inner most layer of the panel faces interior 113 of the building. The panel may be installed so that the outer most layer of the panel faces exterior 114 of the wall or the building. The panel may be customized to variable sizes (e.g., length, width, or thickness) to suit specific needs in energy saving and/or to fit into a wall or a ceiling of the building. The panel may include one or more layers as disclosed herein. The panel may expand less than or equal to the entire thickness of the wall and/or ceiling. The panel may be less than or equal to the entire length or width of the wall and/or ceiling. The panel may be installed at different locations in a wall or ceiling. For example, the panel may be only installed to the north and west facing walls of a building to save cost and/or efficiently resist cold air/wind for a particular climate. The panel may be of various geometrical shapes in its cross-section in addition to the rectangular and square shown. Other non-limiting examples of cross-sectional shape of the panel include oval, triangle, diamond, circle, pentagon, etc.

Figure 14:
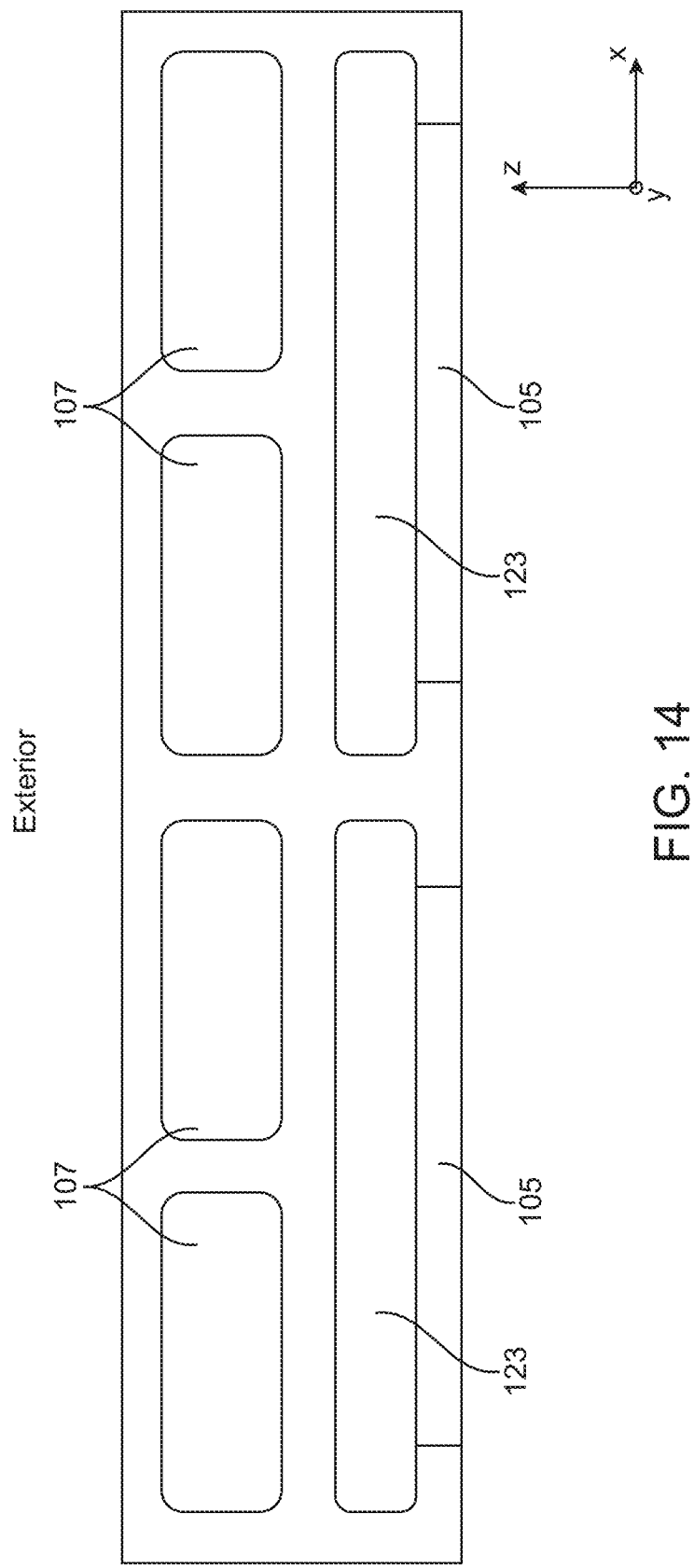
FIG. 14 depicts a cross-section view of an ESP configured for an exterior portion of a building or structure, in accordance with some embodiments.
Figure 15:
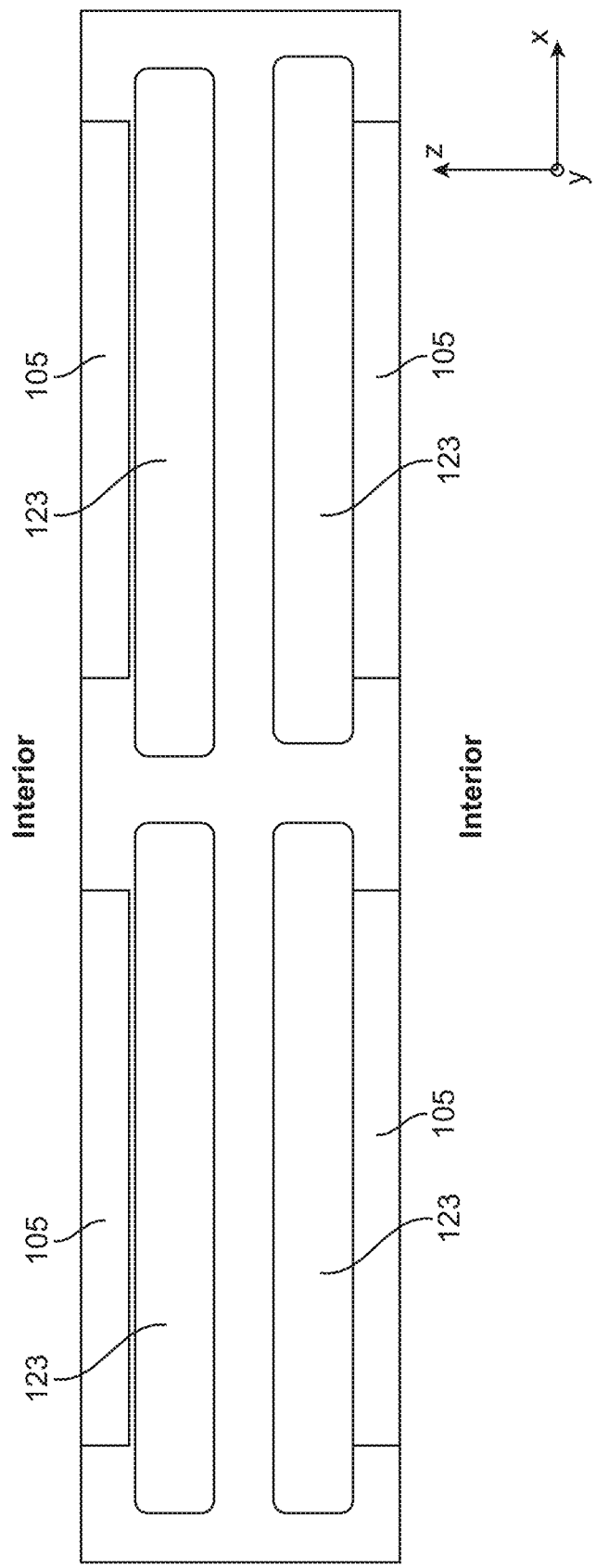
FIG. 15 illustrates a cross-section view of an ESP configured for an interior portion of a building or structure, in accordance with some embodiments.
Figure 24:
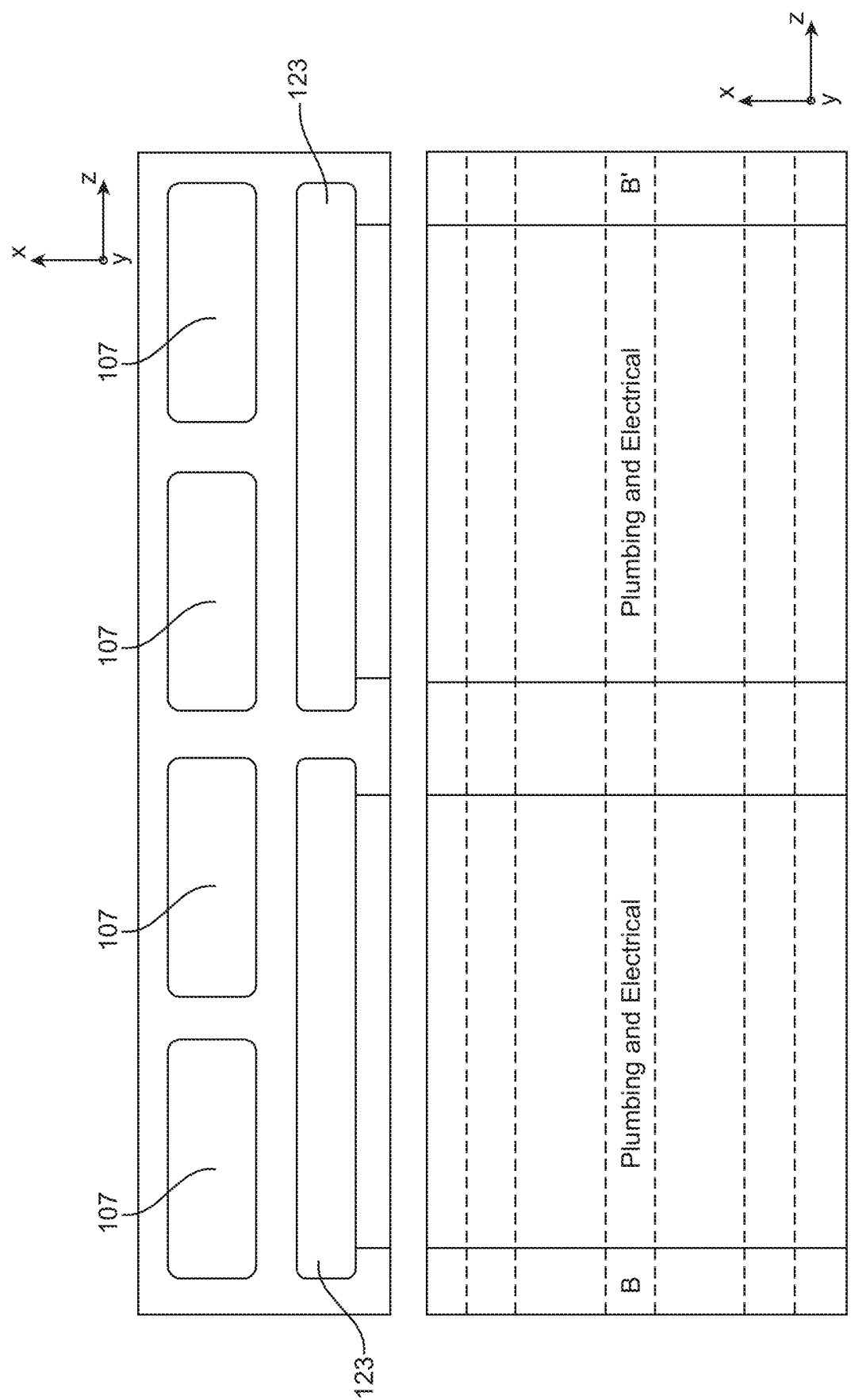
FIG. 24 depicts a front-view schematic of an ESP with internal electrical and plumbing routings in a horizontal fashion.

FIG. 14 depicts a simplified schematic of an ESP configured for exterior portions of a building or structure. This exterior ESP may comprise a void space 123 for passing plumbing, telecommunications, and electrical connections or components, voids that have been filled with an insulating material 107, and an interior-facing thermal panel 105. FIG. 15 shows a simplified schematic of an ESP configured for interior portions of a building or structure. This interior ESP may comprise void spaces 123, and thermal panels 105 aligned toward each room. The construction of these types of ESPs may resemble the construction shown in FIG. 3, described herein. FIG. 24 depicts a particular case where plumbing, electrical, or telecommunication components may be fed through an ESP in a horizontal fashion parallel to the axis defined by B B'. In other cases, electrical, plumbing, or telecommunications components may be fed through an ESP in a vertical, diagonal, acute, oblique, zig-zag or any other fashion.

Figure 3:
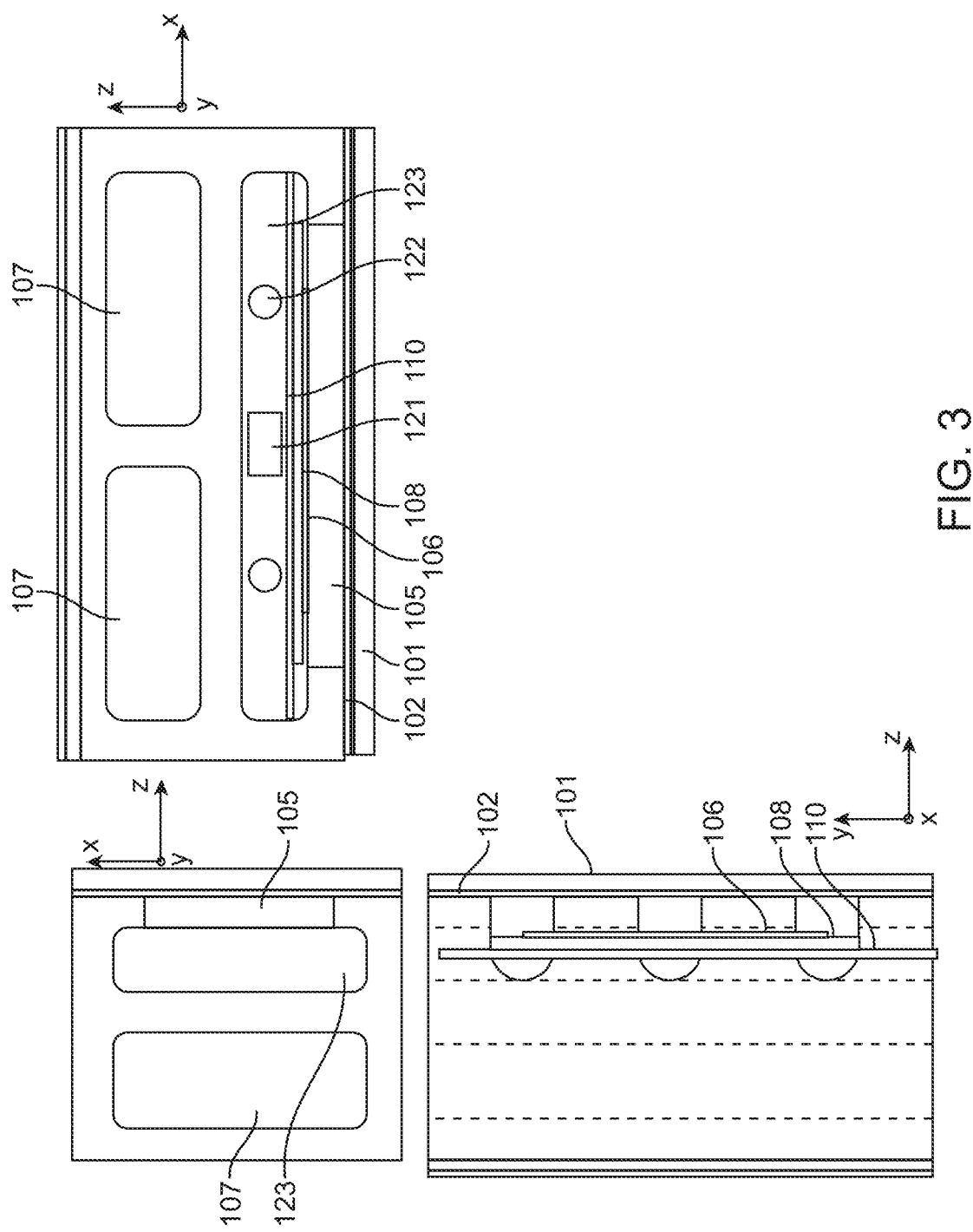
FIG. 3 shows a schematic cross-section of an ESP disclosed herein with a void space for plumbing and electrical feedthroughs, in accordance with some embodiments.

An ESP may incorporate numerous types of materials for various purposes. FIGS. 2 and 3 depict two varying embodiments of assembly for an ESP. Both embodiments may include a thermal panel 105, a drywall surface 101, a metal foil layer 102, a phase-change material (PCM) 106, insulating materials 107, shielding 108, and barrier materials 110. FIG. 3 further illustrates a void space 123 for permitting the passage of electrical components, plumbing, and possibly telecommunications equipment through the ESP.

Numerous embodiments of an ESP may be conceived of given the many possible combinations of materials and structures. In a layered ESP, layers may be directly or indirectly coupled to neighboring or adjacent layers. Coupling may include direct or indirect contact. Component materials may be secured to other materials by a fastening mechanism including physical means (e.g. screws) or chemical means (e.g. adhesives). In some cases, successive layers in a layered ESP may be separated by a gap. In other cases, successive layers may be physically contacted along parts of a contact surface or an entire contact surface.

The ESP may be part of or incorporated into building walls (e.g., outside facing walls, internal walls) and/or ceilings. The ESP may include various thicknesses along z-axis and/or various surface areas along the x-y plane. The sizing of an ESP may be adjusted based upon its location in a structure, its intended purpose (e.g. load-bearing vs. non load-bearing), and any other pertinent considerations. In some cases, the total thickness of an ESP may be about 1 centimeter (cm), 2 cm, 3 cm, 4 cm, 5 cm, 6 cm, 7 cm, 8 cm, 9 cm, 10 cm, 11 cm, 12 cm, 13 cm, 14 cm, 15 cm, 16 cm, 17 cm, 18 cm, 19 cm, 20 cm, 21 cm, 22 cm, 23 cm, 24 cm, 25 cm, 26 cm, 27 cm, 28 cm, 29 cm, 30 cm, 31 cm, 32 cm, 33 cm, 34 cm, 35 cm, 36 cm, 37 cm, 38 cm, 39 cm, 40 cm, 41 cm, 42 cm, 43 cm, 44 cm, 45 cm, 46 cm, 47 cm, 48 cm, 49 cm, 50 cm, 60 cm, 70 cm, 80 cm, 90 cm, 100 cm, 150 cm, or about 200 cm or even thicker based on where the ESP is installed. The total thickness of an ESP may at least about 1 cm, 2 cm, 3 cm, 4 cm, 5 cm, 6 cm, 7 cm, 8 cm, 9 cm, 10 cm, 11 cm, 12 cm, 13 cm, 14 cm, 15 cm, 16 cm, 17 cm, 18 cm, 19 cm, 20 cm, 21 cm, 22 cm, 23 cm, 24 cm, 25 cm, 26 cm, 27 cm, 28 cm, 29 cm, 30 cm, 31 cm, 32 cm, 33 cm, 34 cm, 35 cm, 36 cm, 37 cm, 38 cm, 39 cm, 40 cm, 41 cm, 42 cm, 43 cm, 44 cm, 45 cm, 46 cm, 47 cm, 48 cm, 49 cm, 50 cm, 60 cm, 70 cm, 80 cm, 90 cm, 100 cm, 150 cm, or about 200 cm. The total thickness of an ESP may be no greater than about 200 cm, 150 cm, 100 cm, 90 cm, 80 cm, 70 cm, 60 cm, 50 cm, 49 cm, 48 cm, 47 cm, 46 cm, 45 cm, 44 cm, 43 cm, 42 cm, 41 cm, 40 cm, 39 cm, 38 cm, 37 cm, 36 cm, 35 cm, 34 cm, 33 cm, 32 cm, 31 cm, 30 cm, 29 cm, 28 cm, 27 cm, 26 cm, 25 cm, 24 cm, 23 cm, 22 cm, 21 cm, 20 cm, 19 cm, 18 cm, 17 cm, 16 cm, 15 cm, 14 cm, 13 cm, 12 cm, 11 cm, 10 cm, 9 cm, 8 cm, 7 cm, 6 cm, 5 cm, 4 cm, 3 cm, 2 cm, or about 1 cm. In some cases, the ESP may have a total thickness in a range from about 1 cm to about 10 cm, about 1 cm to about 20 cm, about 1 cm to about 30 cm, about 1 cm to about 40 cm, about 1 cm to about 50 cm, about 1 cm to about 100 cm, about 1 cm to about 150 cm, about 1 cm to about 200 cm, about 10 cm to about 20 cm, about 10 cm to about 30 cm, about 10 cm to about 40 cm, about 10 cm to about 50 cm, about 10 cm to about 100 cm, about 10 cm to about 150 cm, about 10 cm to about 200 cm, about 20 cm to about 30 cm, about 20 cm to about 40 cm, about 20 cm to about 50 cm, about 20 cm to about 100 cm, about 20 cm to about 150 cm, about 20 cm to about 200 cm, about 30 cm to about 40 cm, about 30 cm to about 50 cm, about 30 cm to about 100 cm, about 30 cm to about 150 cm, about 30 cm to about 200 cm, about 40 cm to about 50 cm, about 40 cm to about 100 cm, about 40 cm to about 150 cm, about 40 cm to about 200 cm, about 50 cm to about 100 cm, about 50 cm to about 150 cm, about 50 cm to about 200 cm, about 100 cm to about 150 cm, about 100 cm to about 200 cm, or from about 150 cm to about 200 cm. In certain cases, the thickness of an ESP may be about 10 cm to about 25 cm.

In some cases, the surface area of an ESP may be about 0.01 $m^2$, 0.05 $m^2$, 0.1 $m^2$, 0.2 $m^2$, 0.4 $m^2$, 0.5 $m^2$, 1 $m^2$, 2 $m^2$, 3 $m^2$, 4 $m^2$, 5 $m^2$, 6 $m^2$, 7 $m^2$, 8 $m^2$, 9 $m^2$, 10 $m^2$, 11 $m^2$, 12 $m^2$, 13 $m^2$, 14 $m^2$, 15 $m^2$, 16 $m^2$, 17 $m^2$, 18 $m^2$, 19 $m^2$, 20 $m^2$, 21 $m^2$, 22 $m^2$, 23 $m^2$, 24 $m^2$, 25 $m^2$, 26 $m^2$, 27 $m^2$, 28 $m^2$, 29 $m^2$, 30 $m^2$, 31 $m^2$, 32 $m^2$, 33 $m^2$, 34 $m^2$, 35 $m^2$, 36 $m^2$, 37 $m^2$, 38 $m^2$, 39 $m^2$, 40 $m^2$, or even larger. The surface area of an ESP may be at least about 0.01 $m^2$, 0.05 $m^2$, 0.1 $m^2$, 0.2 $m^2$, 0.4 $m^2$, 0.5 $m^2$, 1 $m^2$, 2 $m^2$, 3 $m^2$, 4 $m^2$, 5 $m^2$, 6 $m^2$, 7 $m^2$, 8 $m^2$, 9 $m^2$, 10 $m^2$, 11 $m^2$, 12 $m^2$, 13 $m^2$, 14 $m^2$, 15 $m^2$, 16 $m^2$, 17 $m^2$, 18 $m^2$, 19 $m^2$, 20 $m^2$, 21 $m^2$, 22 $m^2$, 23 $m^2$, 24 $m^2$, 25 $m^2$, 26 $m^2$, 27 $m^2$, 28 $m^2$, 29 $m^2$, 30 $m^2$, 31 $m^2$, 32 $m^2$, 33 $m^2$, 34 $m^2$, 35 $m^2$, 36 $m^2$, 37 $m^2$, 38 $m^2$, 39 $m^2$, 40 $m^2$, or even larger. The surface area of an ESP may be no greater than about 40 $m^2$, 39 $m^2$, 38 $m^2$, 37 $m^2$, 36 $m^2$, 35 $m^2$, 34 $m^2$, 33 $m^2$, 32 $m^2$, 31 $m^2$, 30 $m^2$, 29 $m^2$, 28 $m^2$, 27 $m^2$, 26 $m^2$, 25 $m^2$, 24 $m^2$, 23 $m^2$, 22 $m^2$, 21 $m^2$, 20 $m^2$, 19 $m^2$, 18 $m^2$, 17 $m^2$, 16 $m^2$, 15 $m^2$, 14 $m^2$, 13 $m^2$, 12 $m^2$, 11 $m^2$, 10 $m^2$, 9 $m^2$, 8 $m^2$, 7 $m^2$, 6 $m^2$, 5 $m^2$, 4 $m^2$, 3 $m^2$, 2 $m^2$, or about 1 $m^2$. In some cases, the surface area of an ESP may have a range from about 0.01 $m^2$ to about 0.1 $m^2$, about 0.01 $m^2$ to about 0.5 $m^2$, about 0.01 $m^2$ to about 1 $m^2$, about 0.01 $m^2$ to about 5 $m^2$, about 0.01 $m^2$ to about 10 $m^2$, about 0.01 $m^2$ to about 15 $m^2$, about 0.01 $m^2$ to about 20 $m^2$, about 0.01 $m^2$ to about 30 $m^2$, about 0.01 $m^2$ to about 40 $m^2$, about 0.1 $m^2$ to about 0.5 $m^2$, about 0.1 $m^2$ to about 1 $m^2$, about 0.1 $m^2$ to about 5 $m^2$, about 0.1 $m^2$ to about 10 $m^2$, about 0.1 $m^2$ to about 15 $m^2$, about 0.1 $m^2$ to about 20 $m^2$, about 0.1 $m^2$ to about 30 $m^2$, about 0.1 $m^2$ to about 40 $m^2$, about 0.5 $m^2$ to about 1 $m^2$, about 0.5 $m^2$ to about 5 $m^2$, about 0.5 $m^2$ to about 10 $m^2$, about 0.5 $m^2$ to about 15 $m^2$, about 0.5 $m^2$ to about 20 $m^2$, about 0.5 $m^2$ to about 30 $m^2$, about 0.5 $m^2$ to about 40 $m^2$, about 1 $m^2$ to about 5 $m^2$, about 1 $m^2$ to about 10 $m^2$, about 1 $m^2$ to about 15 $m^2$, about 1 $m^2$ to about 20 $m^2$, about 1 $m^2$ to about 30 $m^2$, about 1 $m^2$ to about 40 $m^2$, about 5 $m^2$ to about 10 $m^2$, about 5 $m^2$ to about 15 $m^2$, about 5 $m^2$ to about 20 $m^2$, about 5 $m^2$ to about 30 $m^2$, about 5 $m^2$ to about 40 $m^2$, about 10 $m^2$ to about 15 $m^2$, about 10 $m^2$ to about 20 $m^2$, about 10 $m^2$ to about 30 $m^2$, about 10 $m^2$ to about 40 $m^2$, about 15 $m^2$ to about 20 $m^2$, about 15 $m^2$ to about 30 $m^2$, about 15 $m^2$ to about 40 $m^2$, about 20 $m^2$ to about 30 $m^2$, about 20 $m^2$ to about 40 $m^2$, or about 30 $m^2$ to about 40 $m^2$.

An ESP may be made of one or more layers. In some cases, an ESP may have 1, 2, 3, 4, 5, 6, 7, 8, 9, 10 or more layers. An ESP may have at least about 1, 2, 3, 4, 5, 6, 7, 8, 9, 10 or more layers. An ESP may have no more than about 10, 9, 8, 7, 6, 5, 4, 3, 2, or about 1 layer. The number of layers in an ESP may be in a range from about 1 to about 2 layers, about 1 to about 3 layers, about 1 to about 4 layers, about 1 to about 5 layers, about 1 to about 6 layers, about 1 to about 7 layers, about 1 to about 8 layers, about 1 to about 9 layers, or about 1 to about 10 layers.

In some cases, the thickness of an ESP layer may be about 0.01 cm, 0.02 cm, 0.03 cm, 0.04 cm, 0.05 cm, 0.06 cm, 0.07 cm, 0.08 cm, 0.09 cm, 0.1 cm, 0.2 cm, 0.3 cm, 0.4 cm, 0.5 cm, 0.6 cm, 0.7 cm, 0.8 cm, 0.9 cm, 1 cm, 2 cm, 3 cm, 4 cm, 5 cm, 6 cm, 7 cm, 8 cm, 9 cm, 10 cm, 11 cm, 12 cm, 13 cm, 14 cm, 15 cm, 16 cm, 17 cm, 18 cm, 19 cm, 20 cm, 30 cm, 40 cm, 50 cm, 60 cm, 70 cm, 80 cm, 90 cm, 100 cm, 150 cm, or about 200 cm or even thicker based on where the ESP is installed. The thickness of an ESP layer may at least about 0.01 cm, 0.02 cm, 0.03 cm, 0.04 cm, 0.05 cm, 0.06 cm, 0.07 cm, 0.08 cm, 0.09 cm, 0.1 cm, 0.2 cm, 0.3 cm, 0.4 cm, 0.5 cm, 0.6 cm, 0.7 cm, 0.8 cm, 0.9 cm, 1 cm, 2 cm, 3 cm, 4 cm, 5 cm, 6 cm, 7 cm, 8 cm, 9 cm, 10 cm, 11 cm, 12 cm, 13 cm, 14 cm, 15 cm, 16 cm, 17 cm, 18 cm, 19 cm, 20 cm, 30 cm, 40 cm, 50 cm, 60 cm, 70 cm, 80 cm, 90 cm, 100 cm, 150 cm, or about 200. The thickness of an ESP layer may be no greater than about 200 cm, 150 cm, 100 cm, 90 cm, 80 cm, 70 cm, 60 cm, 50 cm, 40 cm, 30 cm, 20 cm, 19 cm, 18 cm, 17 cm, 16 cm, 15 cm, 14 cm, 13 cm, 12 cm, 11 cm, 10 cm, 9 cm, 8 cm, 7 cm, 6 cm, 5 cm, 4 cm, 3 cm, 2 cm, 1 cm, 0.9 cm, 0.8 cm, 0.7 cm, 0.6 cm, 0.5 cm, 0.4 cm, 0.3 cm, 0.2 cm, 0.1 cm, 0.09 cm, 0.08 cm, 0.07 cm, 0.06 cm, 0.05 cm, 0.04 cm, 0.03 cm, 0.02 cm, or about 0.03 cm. In some cases, the ESP layer may have a total thickness in a range from about 0.01 cm to about 0.1 cm, 0.01 cm to about 1 cm, 0.01 cm to about 5 cm, 0.01 cm to about 10 cm, 0.01 cm to about 15 cm, 0.01 cm to about 20 cm, 0.01 cm to about 30 cm, 0.01 cm to about 40 cm, 0.01 cm to about 50 cm, 0.01 cm to about 100 cm, 0.01 cm to about 200 cm, 0.1 cm to about 1 cm, 0.1 cm to about 5 cm, 0.1 cm to about 10 cm, 0.1 cm to about 15 cm, 0.1 cm to about 20 cm, 0.1 cm to about 30 cm, 0.1 cm to about 40 cm, 0.1 cm to about 50 cm, 0.1 cm to about 100 cm, 0.1 cm to about 200 cm, 1 cm to about 5 cm, 1 cm to about 10 cm, 1 cm to about 15 cm, 1 cm to about 20 cm, 1 cm to about 30 cm, 1 cm to about 40 cm, 1 cm to about 50 cm, 1 cm to about 100 cm, 1 cm to about 200 cm, 5 cm to about 10 cm, 5 cm to about 15 cm, 5 cm to about 20 cm, 5 cm to about 30 cm, 5 cm to about 40 cm, 5 cm to about 50 cm, 5 cm to about 100 cm, 5 cm to about 200 cm, 10 cm to about 15 cm, 10 cm to about 20 cm, 10 cm to about 30 cm, 10 cm to about 40 cm, 10 cm to about 50 cm, 10 cm to about 100 cm, 10 cm to about 200 cm, 15 cm to about 20 cm, 15 cm to about 30 cm, 15 cm to about 40 cm, 15 cm to about 50 cm, 15 cm to about 100 cm, 15 cm to about 200 cm, 20 cm to about 30 cm, 20 cm to about 40 cm, 20 cm to about 50 cm, 20 cm to about 100 cm, 20 cm to about 200 cm, 30 cm to about 40 cm, 30 cm to about 50 cm, 30 cm to about 100 cm, 30 cm to about 200 cm, 40 cm to about 50 cm, 40 cm to about 100 cm, 40 cm to about 200 cm, 50 cm to about 100 cm, 50 cm to about 200 cm, or about 100 cm to about 200 cm.

An ESP may have a particular height and width. The height and width of ESPs may be standardized or customizable. ESPs of a particular height may be joined together to create customizable widths. An ESP may have a height of about 3 feet (ft), 4 ft, 5 ft, 6 ft, 7, ft, 8 ft, 9 ft, 10 ft, 11 ft, 12 ft, 13 ft, 14 ft, 15 ft or greater. An ESP may have a height of at least about 3 ft, 4 ft, 5 ft, 6 ft, 7, ft, 8 ft, 9 ft, 10 ft, 11 ft, 12 ft, 13 ft, 14 ft, 15 ft or greater. An ESP may have a height of no greater than about 15 ft, 14 ft, 13 ft, 12 ft, 11 ft, 10 ft, 9 ft, 8 ft, 7 ft, 6 ft, 5 ft, 4 ft, or about 3 ft. An ESP may have a height in a range from about 3 ft to about 6 ft, about 3 ft to about 8 ft, about 3 ft to about 9 ft, about 3 ft to about 10 ft, about 3 ft to about 12 ft, about 3 ft to about 15 ft, about 6 ft to about 8 ft, about 6 ft to about 9 ft, about 6 ft to about 10 ft, about 6 ft to about 12 ft, about 6 ft to about 15 ft, about 8 ft to about 9 ft, about 8 ft to about 10 ft, about 8 ft to about 12 ft, about 8 ft to about 15 ft, about 9 ft to about 10 ft, about 9 ft to about 12 ft, about 9 ft to about 15 ft, about 10 ft to about 12 ft, about 10 ft to about 15 ft, or about 12 ft to about 15 ft. In certain cases, the height of an ESP may be from about 4 ft to about 12 ft. An ESP may have a width of about 1 ft, 2 ft, 3 ft, 4 ft, 5 ft, 6 ft, 7 ft, 8 ft, 9, ft, 10 ft, 12 ft, 15 ft, 20 ft or greater. An ESP may have a width of at least about 1 ft, 2 ft, 3 ft, 4 ft, 5 ft, 6 ft, 7 ft, 8 ft, 9, ft, 10 ft, 12 ft, 15 ft, 20 ft or greater. An ESP may have a width of no greater than about 20 ft, 15 ft, 12 ft, 10 ft, 9 ft, 8 ft, 7 ft, 6 ft, 5 ft, 4 ft, 3 ft, 2 ft, or about 1 ft. An ESP may have a width in a range from about 1 ft to about 2 ft, about 1 ft to about 4 ft, about 1 ft to about 6 ft, about 1 ft to about 10 ft, about 1 ft to about 15 ft, about 1 ft to about 20 ft, about 2 ft to about 4 ft, about 2 ft to about 6 ft, about 2 ft to about 10 ft, about 2 ft to about 15 ft, about 2 ft to about 20 ft, about 4 ft to about 6 ft, about 4 ft to about 10 ft, about 4 ft to about 15 ft, about 4 ft to about 20 ft, about 6 ft to about 10 ft, about 6 ft to about 15 ft, about 6 ft to about 20 ft, about 10 ft to about 15 ft, about 10 ft to about 20 ft, or about 15 ft to about 20 ft. In certain cases, the width of an ESP may be about 2 ft to about 20 ft.

An ESP may have a characteristic mass on an areal basis. An ESP may have a mass on an areal basis of about 0.5 kilograms per square meter (kg/m$^2$), 1 kg/m$^2$, 2 kg/m$^2$, 3 kg/m$^2$, 4 kg/m$^2$, 5 kg/m$^2$, 6 kg/m$^2$, 7 kg/m$^2$, 8 kg/m$^2$, 9 kg/m$^2$, 10 kg/m$^2$, 11 kg/m$^2$, 12 kg/m$^2$, 13 kg/m$^2$, 14 kg/m$^2$, 15 kg/m$^2$, 16 kg/m$^2$, 17 kg/m$^2$, 18 kg/m$^2$, 19 kg/m$^2$, 20 kg/m$^2$, 21 kg/m$^2$, 22 kg/m$^2$, 23 kg/m$^2$, 24 kg/m$^2$, 25 kg/m$^2$, 26 kg/m$^2$, 27 kg/m$^2$, 28 kg/m$^2$, 29 kg/m$^2$, or about 30 kg/m$^2$. An ESP may have a mass on an areal basis of at least about 0.5 kg/m$^2$, 1 kg/m$^2$, 2 kg/m$^2$, 3 kg/m$^2$, 4 kg/m$^2$, 5 kg/m$^2$, 6 kg/m$^2$, 7 kg/m$^2$, 8 kg/m$^2$, 9 kg/m$^2$, 10 kg/m$^2$, 11 kg/m$^2$, 12 kg/m$^2$, 13 kg/m$^2$, 14 kg/m$^2$, 15 kg/m$^2$, 16 kg/m$^2$, 17 kg/m$^2$, 18 kg/m$^2$, 19 kg/m$^2$, 20 kg/m$^2$, 21 kg/m$^2$, 22 kg/m$^2$, 23 kg/m$^2$, 24 kg/m$^2$, 25 kg/m$^2$, 26 kg/m$^2$, 27 kg/m$^2$, 28 kg/m$^2$, 29 kg/m$^2$, or about 30 kg/m$^2$. An ESP may have a mass on an areal basis of no greater than about 30 kg/m$^2$, 29 kg/m$^2$, 28 kg/m$^2$, 27 kg/m$^2$, 26 kg/m$^2$, 25 kg/m$^2$, 24 kg/m$^2$, 23 kg/m$^2$, 22 kg/m$^2$, 21 kg/m$^2$, 20 kg/m$^2$, 19 kg/m$^2$, 18 kg/m$^2$, 17 kg/m$^2$, 16 kg/m$^2$, 15 kg/m$^2$, 14 kg/m$^2$, 13 kg/m$^2$, 12 kg/m$^2$, 11 kg/m$^2$, 10 kg/m$^2$, 9 kg/m$^2$, 8 kg/m$^2$, 7 kg/m$^2$, 6 kg/m$^2$, 5 kg/m$^2$, 4 kg/m$^2$, 3 kg/m$^2$, 2 kg/m$^2$, 1 kg/m$^2$, or about 0.5 kg/m$^2$. An ESP may have a mass on an areal basis from about 0.5 kg/m$^2$ to about 1 kg/m$^2$, about 0.5 kg/m$^2$ to about 5 kg/m$^2$, about 0.5 kg/m$^2$ to about 10 kg/m$^2$, about 0.5 kg/m$^2$ to about 15 kg/m$^2$, about 0.5 kg/m$^2$ to about 20 kg/m$^2$, about 0.5 kg/m$^2$ to about 25 kg/m$^2$, about 0.5 kg/m$^2$ to about 30 kg/m$^2$, about 1 kg/m$^2$ to about 5 kg/m$^2$, about 1 kg/m$^2$ to about 10 kg/m$^2$, about 1 kg/m$^2$ to about 15 kg/m$^2$, about 1 kg/m$^2$ to about 20 kg/m$^2$, about 1 kg/m$^2$ to about 25 kg/m$^2$, about 1 kg/m$^2$ to about 30 kg/m$^2$, about 5 kg/m$^2$ to about 10 kg/m$^2$, about 5 kg/m$^2$ to about 15 kg/m$^2$, about 5 kg/m$^2$ to about 20 kg/m$^2$, about 5 kg/m$^2$ to about 25 kg/m$^2$, about 5 kg/m$^2$ to about 30 kg/m$^2$, about 10 kg/m$^2$ to about 15 kg/m$^2$, about 10 kg/m$^2$ to about 20 kg/m$^2$, about 10 kg/m$^2$ to about 25 kg/m$^2$, about 10 kg/m$^2$ to about 30 kg/m$^2$, about 15 kg/m$^2$ to about 20 kg/m$^2$, about 15 kg/m$^2$ to about 25 kg/m$^2$, about 15 kg/m$^2$ to about 30 kg/m$^2$, about 20 kg/m$^2$ to about 25 kg/m$^2$, about 20 kg/m$^2$ to about 30 kg/m$^2$, or about 25 kg/m$^2$ to about 30 kg/m$^2$.

An ESP may have a characteristic mass on a volumetric basis. An ESP may have a mass on a volumetric basis of about 100 kilograms per cubic meter (kg/m$^3$), 200 kg/m$^3$, 300 kg/m$^3$, 400 kg/m$^3$, 500 kg/m$^3$, 600 kg/m$^3$, 700 kg/m$^3$, 800 kg/m$^3$, 900 kg/m$^3$, 1000 kg/m$^3$, 1500 kg/m$^3$, 2000 kg/m$^3$, 2500 kg/m$^3$, or about 3000 kg/m$^3$. An ESP may have a mass on a volumetric basis of at least about 100 kg/m$^3$, 200 kg/m$^3$, 300 kg/m$^3$, 400 kg/m$^3$, 500 kg/m$^3$, 600 kg/m$^3$, 700 kg/m$^3$, 800 kg/m$^3$, 900 kg/m$^3$, 1000 kg/m$^3$, 1500 kg/m$^3$, 2000 kg/m$^3$, 2500 kg/m$^3$, or about 3000 kg/m$^3$. An ESP may have a weight on a volumetric basis of no greater than about 3000 kg/m$^3$, 2500 kg/m$^3$, 2000 kg/m$^3$, 1500 kg/m$^3$, 1000 kg/m$^3$, 900 kg/m$^3$, 800 kg/m$^3$, 700 kg/m$^3$, 600 kg/m$^3$, 500 kg/m$^3$, 400 kg/m$^3$, 300 kg/m$^3$, 200 kg/m$^3$, or about 100 kg/m$^3$. An ESP may have a mass on a volumetric basis in a range from about 100 kg/m$^3$ to about 500 kg/m$^3$, about 100 kg/m$^3$ to about 1000 kg/m$^3$, about 100 kg/m$^3$ to about 1500 kg/m$^3$, about 100 kg/m$^3$ to about 2000 kg/m$^3$, about 100 kg/m$^3$ to about 2500 kg/m$^3$, about 100 kg/m$^3$ to about 3000 kg/m$^3$, about 500 kg/m$^3$ to about 1000 kg/m$^3$, about 500 kg/m$^3$ to about 1500 kg/m$^3$, about 500 kg/m$^3$ to about 2000 kg/m$^3$, about 500 kg/m$^3$ to about 2500 kg/m$^3$, about 500 kg/m$^3$ to about 3000 kg/m$^3$, about 1000 kg/m$^3$ to about 1500 kg/m$^3$, about 1000 kg/m$^3$ to about 2000 kg/m$^3$, about 1000 kg/m$^3$ to about 2500 kg/m$^3$, about 1000 kg/m$^3$ to about 3000 kg/m$^3$, about 1500 kg/m$^3$ to about 2000 kg/m$^3$, about 1500 kg/m$^3$ to about 2500 kg/m$^3$, about 1500 kg/m$^3$ to about 3000 kg/m$^3$, about 2000 kg/m$^3$ to about 2500 kg/m$^3$, about 2000 kg/m$^3$ to about 3000 kg/m$^3$, or about 2500 kg/m$^3$ to about 3000 kg/m$^3$.

An ESP may have one or more incorporated materials that increase the thermal resistance of the material. The overall insulating characteristics of an ESP may be defined by an R-value. An ESP may have an overall R-value of about 0.5, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, or about 60. An ESP may have an overall R-value of at least about 0.5, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, or about 60. An ESP may have an overall R-value of no more than about 60, 59, 58, 57, 56, 55, 54, 53, 52, 51, 50, 49, 48, 47, 46, 45, 44, 43, 42, 41, 40, 39, 38, 37, 36, 35, 34, 33, 32, 31, 30, 29, 28, 27, 26, 25, 24, 23, 22, 21, 20, 19, 18, 17, 16, 15, 14, 13, 12, 11, 10, 9, 8, 7, 6, 5, 4, 3, 2, 1, or about 0.5. An ESP may have an overall R-value in a range from about 0.5 to about 5, about 0.5 to about 10, about 0.5 to about 20, about 0.5 to about 30, about 0.5 to about 40, about 0.5 to about 50, about 0.5 to about 60, about 5 to about 10, about 5 to about 20, about 5 to about 30, about 5 to about 40, about 5 to about 50, about 5 to about 60, about 10 to about 20, about 10 to about 30, about 10 to about 40, about 10 to about 50, about 10 to about 60, about 20 to about 30, about 20 to about 40, about 20 to about 50, about 20 to about 60, about 30 to about 40, about 30 to about 50, about 30 to about 60, about 40 to about 50, about 40 to about 60, or about 50 to about 60. In some cases, an optimal R-value may be from about 10 to about 60.

Material incorporated into an ESP may have chosen to enhance the insulating properties of the ESP. A particular ESP-incorporated material may have an R-value of about 0.5, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 70, 80, 90, 100, or greater. A particular ESP-incorporated material may have an R-value of at least about 0.5, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 70, 80, 90, 100 or greater. A particular ESP-incorporated material may have an R-value of no greater than about 100, 90, 80, 70, 60, 59, 58, 57, 56, 55, 54, 53, 52, 51, 50, 49, 48, 47, 46, 45, 44, 43, 42, 41, 40, 39, 38, 37, 36, 35, 34, 33, 32, 31, 30, 29, 28, 27, 26, 25, 24, 23, 22, 21, 20, 19, 18, 17, 16, 15, 14, 13, 12, 11, 10, 9, 8, 7, 6, 5, 4, 3, 2, 1, or about 0.5. A particular ESP-incorporated material may have an R-value in a range from about 0.5 to about 5, about 0.5 to about 10, about 0.5 to about 20, about 0.5 to about 30, about 0.5 to about 40, about 0.5 to about 50, about 0.5 to about 100, about 5 to about 10, about 5 to about 20, about 5 to about 30, about 5 to about 40, about 5 to about 50, about 5 to about 100, about 10 to about 20, about 10 to about 30, about 10 to about 40, about 10 to about 50, about 10 to about 100, about 20 to about 30, about 20 to about 40, about 20 to about 50, about 20 to about 100, about 30 to about 40, about 30 to about 50, about 30 to about 100, about 40 to about 50, about 40 to about 100, or about 50 to about 100. In some cases, an optimal R-value may be from about 10 to about 60.

An ESP may be designed to decrease the flammability or increase the fire resistance of a building or structure. Fire resistance may include resistance to fires from any external source, including wildfires and fires spreading from neighboring structures. Fire resistance may include resistance to internal fires, such as cooking fires, electrical fires, and appliance fires. An ESP may include materials specifically designed to be non-flammable, such as concretes and fiberglasses. An ESP may maintain its structure and properties after being exposed to an external or internal fire. A building comprising ESPs may sufficiently withstand fire so as to allow rapid reconstruction after a fire. For example, a building or structure in a wildfire may only incur significant roof damage while the internal areas of the house remain undamaged or lightly damaged. An ESP may be designed and assembled to meet a particular flammability standard, e.g. ASTM E2707-15.

An ESP may alter the energy consumption level of a building or structure when compared to an equivalent building that does not incorporate ESPs. The incorporation of one or more ESPs may reduce the total energy consumption of a building or structure by about 10%, 20%, 30%, 40%, 50%, 60%, 70%, 80%, 90%, or greater. The incorporation of one or more ESPs may reduce the total energy consumption of a building or structure by at least about 10%, 20%, 30%, 40%, 50%, 60%, 70%, 80%, 90%, or greater. The total energy consumption may be defined as the total amount of energy that must be supplied via an external source (e.g. power lines) to the building for all activities within the building. The incorporation of one or more ESPs may reduce the thermal energy consumption of a building or structure by about 10%, 20%, 30%, 40%, 50%, 60%, 70%, 80%, 90%, or greater. The incorporation of one or more ESPs may reduce the thermal energy consumption of a building or structure by at least about 10%, 20%, 30%, 40%, 50%, 60%, 70%, 80%, 90%, or greater. The thermal energy consumption may be defined as the total amount of energy that must be supplied by an external source (e.g. power lines) for thermal control of a building, including the energy costs of heating, ventilation, and air conditioning (cooling).

Drywall Layer

In some cases, the ESP 100 may include a layer of drywall, plasterboard, wallboard, gypsum panel, Sheetrock®, gypsum board, or the like. The sheet rock layer 101, as shown in FIGS. 2, 4A-4C, and 17, may be a panel including calcium sulfate dihydrate (gypsum). The sheet rock layer may be with or without additives and pressed between two sheets, e.g., thick sheets of paper. FIGS. 4B-4C show cross sections within the x-z plane and y-z plane, respectively. In some cases, the sheet of paper may be recycled paper, and the gypsum, or more generally, types of rocks turned into powders are enclosed within the two sheets, with or without any gypsum exposed to the exterior of the dry wall layer. The drywall layer may correspond to the most interior layer of the ESP. In some cases, the additives may include fiber (e.g., paper, fiberglass), plasticizer, foaming agent, and various other additives that can help decrease mildew, increase fire resistance, and lower water absorption. The drywall layer may be made of low volatile organic compound (VOC) emitting material.

The drywall layer may be GREENGUARD Gold certified. The drywall layer may meet or exceed the ASTM C1396 code which includes specification for gypsum board/layers.

In some cases, the sheet rock layer may be positioned so that it does not extend outside the surface area of the ESP along the x-y plane.

In some cases, the drywall layer/board may include a USG Sheetrock gypsum board. The drywall layer may be about half inch thick.

Metal Foils

In some cases, the ESP 100 may include a layer of a metal foil/alloy 102 as shown in FIGS. 2, 5A-5C, and 16. In some embodiments, the metal foil is attached onto a drywall layer 101. The metal foil may be a second most interior layer along the z axis. In some cases, the foil 102 may be configured to provide conductivity as the heating and cooling transfers, e.g., through or from other layers, to the drywall layer via the metal foil. In some cases, the foil may include a sustainable material that does not form rust. Any suitable metal or alloy may be used in a foil layer. In some cases, the metal foil may be an aluminum foil. The aluminum foil may be alloyed with various other elements such as magnesium, manganese, copper, nickel, silicon, or zinc. The metal foil/alloy herein may be durable, versatile, and easy to use. The metal foil/alloy herein may facilitate heating and cooling to its adjacent layer(s) (e.g., drywall layer 101) of the ESP. A metal foil may be utilized in large sheets, tapes, or wraps. A metal foil may comprise additional components such as polymers, plastics, paper-backing, or insulating materials.

A metal foil may be chosen to have particular radiative heat transfer properties. A metal foil may have a dull finish or a mirror-like finish. A metal foil may have a chosen emissivity depending upon its composition and surface characteristics. A metal foil may have an emissivity of about 0.05, 0.06, 0.07, 0.08, 0.09, 0.10, 0.15, 0.20, 0.25, 0.30, or about 0.40. A metal foil may have an emissivity of at least about 0.05, 0.06, 0.07, 0.08, 0.09, 0.10, 0.15, 0.20, 0.25, 0.30, or about 0.40. A metal foil may have an emissivity of no greater than about 0.40, 0.30, 0.25, 0.20, 0.15, 0.10, 0.09, 0.08, 0.07, 0.06, or about 0.05. A metal foil may have an emissivity in a range from about 0.05 to about 0.10, about 0.05 to about 0.20, about 0.05 to about 0.30, about 0.05 to about 0.40, about 0.10 to about 0.20, about 0.10 to about 0.30, about 0.10 to about 0.40, about 0.20 to about 0.30, about 0.20 to about 0.40, or about 0.30 to about 0.40.

Structural Materials

An ESP may include structural materials that provide shape, structure, or strength to the panel. In some cases, one or more structural materials may comprise a frame or mold for attaching, holding, or securing other materials in an ESP. Structural materials may include studs, rods, bars, and sheets. Metals, woods, and concretes, and composite materials may be used for structural materials. These materials may be arranged as frame and filled with other materials such as insulation. In some cases, structural materials may comprise a layer of an ESP.

An ESP may comprise concrete as a structural material. The concrete may be precast before assembly of an ESP. The concrete may contain other structural elements, such as rebar, to increase the strength or rigidity of the panel. The concrete may contain other fillers to alter the concrete properties, such as fiberglass or resins. Concrete fillers may be added to decrease the weight or density of an ESP panel or alter the thermal characteristics of the concrete. Additional layers of an ESP (e.g. insulation, PCMs) may be secured to the surface of a concrete structural component.

Figure 6B:
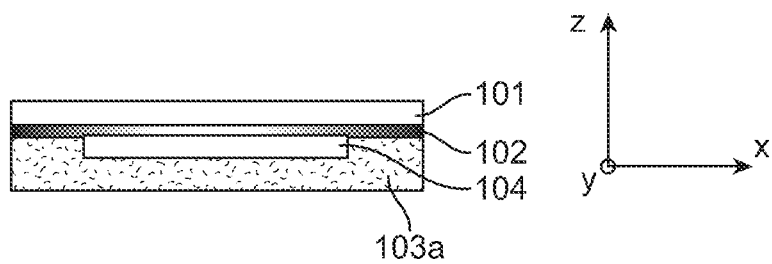
FIGS. 6B-6C illustrate the cross sections of the stud frame layer in FIG. 6A, in accordance with some embodiments.
Figures 6A, 6C:
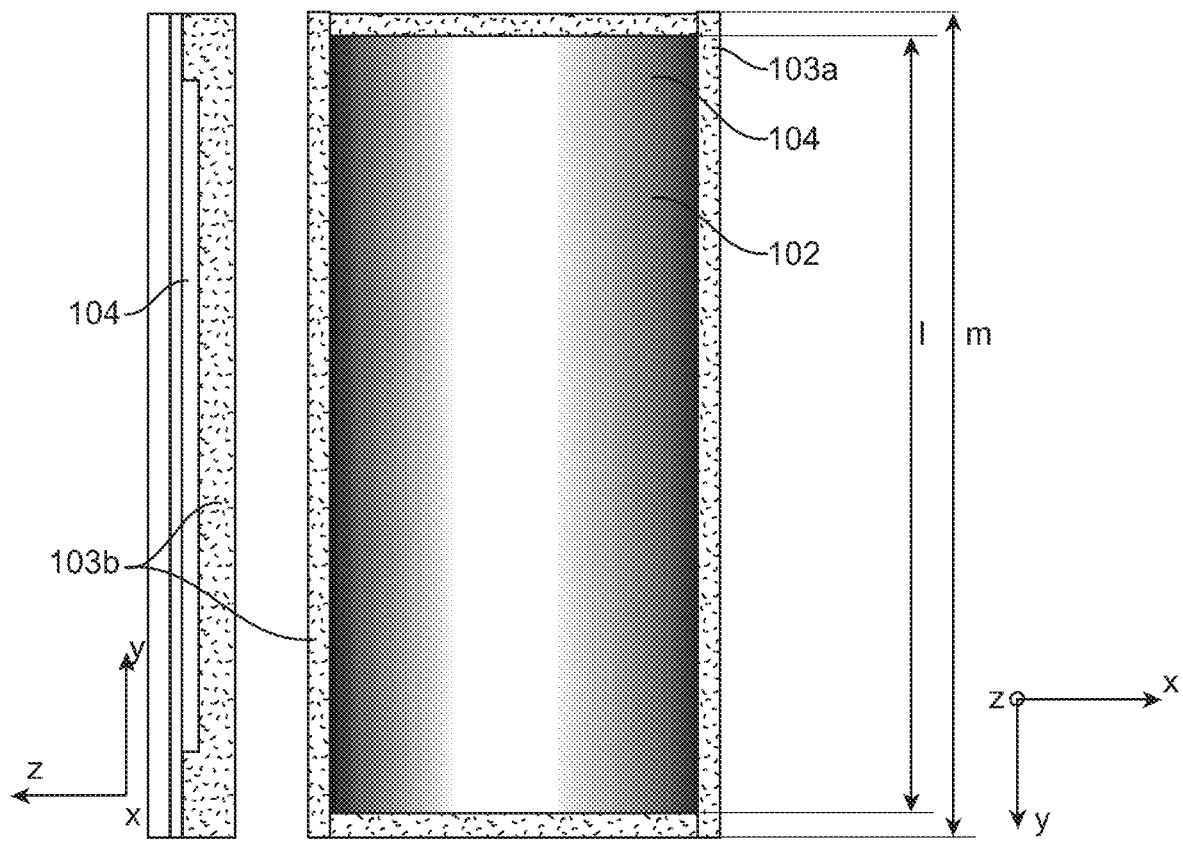
FIG. 6A illustrates an example of a layer of the eco smart panel disclosed herein, in this case, a stud frame attached to the drywall layer and the foil layer.

In some cases, the ESP may include a layer of stud(s) 103a, 103b as shown in FIGS. 2 and 6A-6C. Such studs may be placed on at least a portion of the surface area as shown in FIG. 6. The stud may include an outside frame stud 103a and a middle stud 103b. Stud(s) may be premium kiln dried for straight edge(s). A stud may have a common commercial sizing or be a custom size. A stud may have a nominal size, including 1×2, 1×3, 1×4, 1×6, 1×8, 1×10, 1×12, 2×2, 2×3, 2×4, 2×6, 2×8, 2×10, 2×12, 4, ×4, 4×6, or 4×8. A nominal sizing may not reflect the actual dimensions of the stud. A stud may include various sizes along x, y, or z axis. In some cases, the stud 103a, 103b may include a size, l, along the y direction that is no greater than that the size, m, of the ESP, as shown in FIG. 6A.

In some cases, the stud(s) are sized so as to provide space for the insulating material to hold the phase change material (PCM) in place.

In some cases, studs are fastened with screws, e.g., galvanized, from the drywall layer 101. Such fastening may provide an opening 104 for the solar thermal panels 105 and PCM material 106 of the ESP. Thus, the solar thermal panels and PCM material may be placed adjacent to the drywall layer 101, the foil layer 102, the structural layer (103a, 103b), and/or the extruded polystyrene (XPS) insulation layer 107.

The stud frame may include additional stud 103c. For example, as in FIGS. 8A-8C, a stud (e.g., 2 inches by 2 inches) can be mounted between the Phase Change Material and the Insulation to provide structural support for the panel. Such additional stud 103c may also provide strength to the thermal panel attached to the sheetrock and connecting the plumbing lines.

In some cases, a structural material may be constructed to form a pre-fabricated structure before final assembly of the ESP. A structural material may be extruded into the shape of the ESP support. Extruded structural materials may include fiberglass foams or resins. An extruded structure may include void spaces for adding elements of an ESP (e.g. a solar thermal panel). Void spaces may be used to insert elements into the ESP during assembly. Void spaces may be filled with other materials, such as fiberglass or gypsum, after assembly of an ESP.

Solar Thermal Panel(s)

In some cases, the ESP includes a layer of solar thermal panel 105 as shown in FIGS. 2, 7A-7D, and 17. The solar panel can be configured to collect solar energy. Such collected solar energy may be used to provide heating and cooling without using gas furnaces or refrigerants such as freon gas for air-conditioning. In some cases, an ESP may comprise at least 1, 2, 3, 4, 5, 6, 7, 8, 9, 10 or more solar thermal panels.

In some cases, the solar thermal panels herein are similar to the solar panels on the roof to collect the heat and run it through the heat pump thus providing hot water for the building.

In some cases, the solar thermal panel is configured to allow passive solar heating. Such solar thermal panel may be made to collect, store, and distribute solar energy in the form of heat when needed, for example, in the winter. In some cases, the solar thermal panel along or in combination with other layers of the ESP is configured to allow passive solar cooling by rejecting solar heat, for example, in the summer. The passive solar heating or solar cooling need not involve the use of mechanical and/or electrical devices. As an example, the solar thermal panel may collect/store thermal energy during the day time and distribute the thermal energy for heating at night. Passive solar heating or cooling may utilize a local climate estimate and/or a site analysis of the building for efficient and accurate heating and cooling.

A solar thermal panel may have a rated thermal capacity. A solar thermal panel may absorb about 10 Watts per square meter ($W/m^2$), 50 $W/m^2$, 100 $W/m^2$, 150 $W/m^2$, 200 $W/m^2$, 250 $W/m^2$, 300 $W/m^2$, 350 $W/m^2$, or about 400 $W/m^2$. A solar thermal panel may absorb at least about 10 $W/m^2$, 50 $W/m^2$, 100 $W/m^2$, 150 $W/m^2$, 200 $W/m^2$, 250 $W/m^2$, 300 $W/m^2$, 350 $W/m^2$, or about 400 $W/m^2$. A solar thermal panel may absorb no greater than about 400 $W/m^2$, 350 $W/m^2$, 300 $W/m^2$, 250 $W/m^2$, 200 $W/m^2$, 150 $W/m^2$, 100 $W/m^2$, 50 $W/m^2$, or about 10 $W/m^2$. A solar thermal panel may absorb energy in a range from about 10 $W/m^2$ to about 50 $W/m^2$, about 10 $W/m^2$ to about 100 $W/m^2$, about 10 $W/m^2$ to about 150 $W/m^2$, about 10 $W/m^2$ to about 200 $W/m^2$, about 10 $W/m^2$ to about 250 $W/m^2$, about 10 $W/m^2$ to about 300 $W/m^2$, about 10 $W/m^2$ to about 350 $W/m^2$, about 10 $W/m^2$ to about 400 $W/m^2$, about 50 $W/m^2$ to about 100 $W/m^2$, about 50 $W/m^2$ to about 150 $W/m^2$, about 50 $W/m^2$ to about 200 $W/m^2$, about 50 $W/m^2$ to about 250 $W/m^2$, about 50 $W/m^2$ to about 300 $W/m^2$, about 50 $W/m^2$ to about 350 $W/m^2$, about 50 $W/m^2$ to about 400 $W/m^2$, about 100 $W/m^2$ to about 100 $W/m^2$, about 100 $W/m^2$ to about 150 $W/m^2$, about 100 $W/m^2$ to about 200 $W/m^2$, about 100 $W/m^2$ to about 250 $W/m^2$, about 100 $W/m^2$ to about 300 $W/m^2$, about 100 $W/m^2$ to about 350 $W/m^2$, about 100 $W/m^2$ to about 400 $W/m^2$, about 150 $W/m^2$ to about 200 $W/m^2$, about 150 $W/m^2$ to about 250 $W/m^2$, about 150 $W/m^2$ to about 300 $W/m^2$, about 150 $W/m^2$ to about 350 $W/m^2$, about 150 $W/m^2$ to about 400 $W/m^2$, about 200 $W/m^2$ to about 250 $W/m^2$, about 200 $W/m^2$ to about 300 $W/m^2$, about 200 $W/m^2$ to about 350 $W/m^2$, about 200 $W/m^2$ to about 400 $W/m^2$, about 250 $W/m^2$ to about 300 $W/m^2$, about 250 $W/m^2$ to about 350 $W/m^2$, about 250 $W/m^2$ to about 400 $W/m^2$, about 300 $W/m^2$ to about 350 $W/m^2$, about 300 $W/m^2$ to about 400 $W/m^2$, or about 350 $W/m^2$ to about 400 $W/m^2$.

A single solar thermal panel may collect an amount of energy per day. A single solar thermal panel may collect 1 kiloWatt-hour (kWh), 5 kWh, 10 kWh, 20 kWh, 30 kWh, 40 kWh, 50 kWh, 60 kWh, 70 kWh, 80 kWh, 90 kWh, or about 100 kWh. A solar thermal panel may collect no more than about 1 kWh, 5 kWh, 10 kWh, 20 kWh, 30 kWh, 40 kWh, 50 kWh, 60 kWh, 70 kWh, 80 kWh, 90 kWh, or about 100 kWh. A solar thermal panel may collect no greater than about 100 kWh, 90 kWh, 80 kWh, 70 kWh, 60 kWh, 50 kWh, 40 kWh, 30 kWh, 20 kWh, 10 kWh, 5 kWh, or about 1 kWh. A solar thermal panel may collect about 1 kWh to about 5 kWh, about 1 kWh to about 20 kWh, about 1 kWh to about 40 kWh, about 1 kWh to about 60 kWh, about 1 kWh to about 80 kWh, about 1 kWh to about 100 kWh, about 5 kWh to about 20 kWh, about 5 kWh to about 40 kWh, about 5 kWh to about 60 kWh, about 5 kWh to about 80 kWh, about 5 kWh to about 100 kWh, about 20 kWh to about 40 kWh, about 20 kWh to about 60 kWh, about 20 kWh to about 80 kWh, about 20 kWh to about 100 kWh, about 40 kWh to about 60 kWh, about 40 kWh to about 80 kWh, about 40 kWh to about 100 kWh, about 60 kWh to about 80 kWh, about 60 kWh to about 100 kWh, or about 80 kWh to about 100 kWh.

In some cases, the solar thermal panel can be configured to allow active solar heating and/or cooling. In some cases, active heating or cooling may require additional elements such as a heat pump, thermoelectric device or other devices that may convert one type of energy into heating or cooling. As an example, solar thermal energy may be collected and transformed into electrical energy that powers a heat pump, a coil heat exchanger, or a thermoelectric device for cooling. As another example, solar thermal energy may be directly used to heat fluid for heating.

In some cases, the solar thermal panel may include one or more of: a dark flat-plate absorber, a transparent cover that reduces heat losses, a heat-transport fluid (e.g., air, antifreeze, water) to transfer heat from the absorber, and/or a heat-insulating element. The absorber may include a sheet (e.g., thermally-stable polymers, aluminum, steel or copper). In some cases, a coating, such as a matte dark coating may be applied to the absorber sheet. In some cases, the absorber sheet is positioned adjacent to a grid or coil of heat-transfer fluid tubing placed in an insulated casing.

As shown in FIGS. 7A-7C, the ESP may include one or more solar thermal panels and each panel may occupy part of the surface area of the ESP. In some cases, the total surface area of all the panels may occupy an area that is less than or equal to the surface area of the ESP along the x-y plane. As an example, the solar panel layer 105 may not cover the studs 103*a*, 103*b* as shown in FIGS. 7A-7C.

Figure 7D:
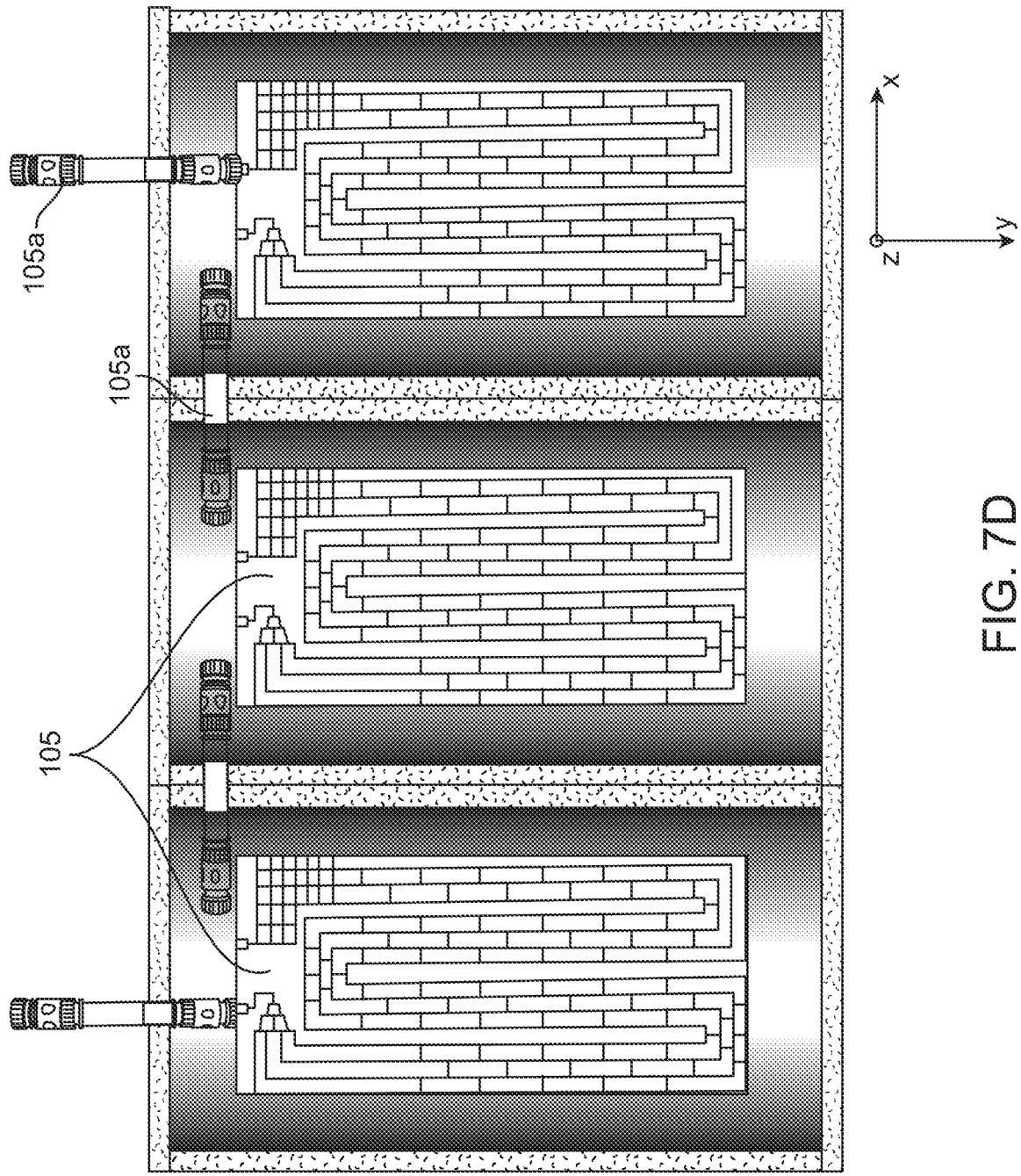
FIG. 7D illustrates an example of connected solar thermal panels using connector(s), in accordance with some embodiments.

FIG. 7D shows how the more than one solar thermal panel may be connected via one or more electrically-conductive connectors 105*a*, so that more than one solar panel can be connected in series or in parallel. The connectors 105*a* may be any suitable connectors or commercially available connectors such as a MC4 solar panel connector.

In some cases, one or more of the solar thermal panels may include a thickness along the z axis in the range of about 1 cm to about 0.5 m.

Phase Change Material (PCM)

The ESP may include a phase change material (PCM) layer 106 as in FIGS. 2, 8A-8C, and 19. The PCM may be encapsulated, as a nonlimiting example, in one or more enclosures 106 as shown in FIGS. 8A-C. The one or more enclosures may be formed by metal foil and/or other thermal conductive material. Each enclosure may be of various 3-D shapes, for example, approximately rectangular shape within the x-y plane as in FIGS. 6A-6C. Other nonlimiting examples of enclosure shape include square, diamond, circle, etc. In some cases, the PCM layer may occupy an area that is no greater than the surface area of the ESP. As an example, the PCM layer may not cover the studs 103*a*, 103*b* as shown in FIGS. 6A-6C. In some cases, each enclosure may have a uniform or non-uniform thickness along the z axis when the PCM is in a solid or fluid state.

In some cases, the PCM material of the ESP herein forms a separate layer. For example, the PCM material may be placed within an enclosure formed between two adjacent layers, and the enclosure may occupy at least a part of an entire surface area of the ESP within the x-y plane. In some cases, the PCM material may occupy about 20%, 30%, 40%, 50%, or even larger portion of the entire surface area within the x-y plane. The PCM material of the ESP may or may be not embedded in any insulating material or any other layer of the ESP. The PCM material may heat up one or more layers that are interior to the PCM material, such as the drywall layer 101, thereby allowing passive heating of the interior surface of the building using the energy stored by the PCM material. The PCM material/layer in the ESP may facilitate the provision of a consistent temperature for the ESP panel in conjunction with the radiant heating and cooling. Thus, the ESP with phase change material (PCM) 106 may be configured to provide passive energy savings. The ESP may include a separate reflective sheet to reflect the energy, or use one or more layers alone or in combination for providing reflection of energy, thereby enabling further passive energy savings.

A PCM may be chosen from any suitable material depending upon the expected operating conditions and the desired performance characteristics. A PCM may be chosen to operate in a narrower temperature range in certain environments that have modest seasonal temperature changes, e.g. coastal California. A PCM may be chosen to operate in a broader temperature range for other environments that experience larger seasonal temperature variation, e.g. the Great Plains of the United States and Canada. Candidate materials for PCMs may include paraffin waxes, bio-based waxes, other bio-based materials (e.g. carbohydrates or lipids), salt hydrates, inorganic eutectic materials, hygroscopic materials, and solid-solid materials. A PCM may be composed of more than one material to increase the range of temperature performance.

In some cases, energy efficiency of the ESP may be determined by the PCM layer. The PCM may be non-toxic and non-corrosive. The PCM may have a useful life about 10, 20, 30, 40, 50, 60, 70, 80, 90, or 100 years or even longer. A PCM may have a useful life of at least about 10, 20, 30, 40, 50, 60, 70, 80, 90, or 100 years or even longer. A PCM may have a useful life in a range from about 10 years to about 20 years, about 10 years to about 40 years, about 10 years to about 60 years, about 10 years to about 80 years, about 10 years to about 100 years, about 20 years to about 40 years, about 20 years to about 60 years, about 20 years to about 80 years, about 20 years to about 100 years, about 40 years to about 60 years, about 40 years to about 80 years, about 40 years to about 100 years, about 60 years to about 80 years, about 60 years to about 100 years, or about 80 years to about 100 years.

A PCM may have a wide range of possible operating temperatures. A PCM may be optimized to function at a particular temperature or be configured to offer performance over a broad range of temperatures. A PCM may have an optimum performance at a temperature of about $-50°$ C., $-40°$ C., $-30°$ C., $-20°$ C., $-10°$ C., $0°$ C., $10°$ C., $20°$ C., $30°$ C., $40°$ C., $50°$ C., $60°$ C., $70°$ C., $80°$ C., or about $90°$ C. A PCM may have optimum performance at a temperature of at least about $-50°$ C., $-40°$ C., $-30°$ C., $-20°$ C., $-10°$ C., $0°$ C., $10°$ C., $20°$ C., $30°$ C., $40°$ C., $50°$ C., $60°$ C., $70°$ C., $80°$ C. or about, $90°$ C. A PCM may have optimum performance at a temperature of no greater than about $90°$ C., $80°$ C., $70°$ C., $60°$ C., $50°$ C., $40°$ C., $30°$ C., $20°$ C., $10°$ C., $0°$ C., $10°$ C., $0°$ C., $-10°$ C. $°-10°$ C., $-20°$ C., $-30°$ C., $-40°$ C., $-°$ C., or about $-50°$ C. A PCM may be optimized to perform in a range from about $-50°$ C. to about $-20°$ C., $-50°$ C. to about $0°$ C., $-50°$ C. to about $10°$ C., $-50°$ C. to about $20°$ C., $-50°$ C. to about $30°$ C., $-50°$ C. to about $40°$ C., $-50°$ C. to about $50°$ C., $-50°$ C. to about $90°$ C., $-20°$ C. to about $0°$ C., $-20°$ C. to about $10°$ C., $-20°$ C. to about $20°$ C., $-20°$ C. to about $30°$ C., $-20°$ C. to about $40°$ C., $-20°$ C. to about $50°$ C., $-20°$ C. to about $90°$ C., $0°$ C. to about $10°$ C., $0°$ C. to about $20°$ C., $0°$ C. to about $30°$ C., $0°$ C. to about $40°$ C., $0°$ C. to about $50°$ C., $0°$ C. to about $90°$ C., $10°$ C. to about $20°$ C., $10°$ C. to about $30°$ C., $10°$ C. to about $40°$ C., $10°$ C. to about $50°$ C., $10°$ C. to about $90°$ C., $20°$ C. to about $30°$ C., $20°$ C. to about $40°$ C., $20°$ C. to about $50°$ C., $20°$ C. to about $90°$ C., $30°$ C. to about $40°$ C., $30°$ C. to about $50°$ C., $30°$ C. to about $90°$ C., $40°$ C. to about $50°$ C., $40°$ C. to about $90°$ C., or $50°$ C. to about $90°$ C.

When installed within the panel, the PCM layer may passively stabilize interior temperature without using additional mechanical or electrical elements. For instances, the PCM layer may absorb heat when the temperature exceeds a desired targeted temperature and release heat when the temperature falls below the same or another targeted temperature. A PCM may be designed and incorporated into an ESP to passively limit the temperature change within the interior of a building or structure. An interior temperature differential may represent the interior temperature change between peak heating and peak cooling over the course of a day within a particular interior room in the building or structure. A passive interior temperature differential may represent the interior temperature change between the minimum temperature and maximum temperature over the course of a 24 hour period within a particular interior room or space in the building or structure when no heating, ventilation, or air conditioning is utilized. A PCM may be designed to passively limit the interior temperature differential to about $1°$ C. $2°$ C., $3°$ C., $4°$ C., $5°$ C. $6°$ C., $7°$ C., $8°$ C., $9°$ C., $10°$ C., $11°$ C., $12°$ C., $13°$ C., $14°$ C., $15°$ C., $16°$ C., $17°$ C., $18°$ C., $19°$ C. or about $20°$ C., between peaking cooling and peak heating. A PCM may be designed to passively limit the interior temperature differential to about $1°$ C., $2°$ C., $3°$ C., $4°$ C., $5°$ C., $6°$ C., $7°$ C., $8°$ C., $9°$ C., $10°$ C., $11°$ C., $12°$ C., $13°$ C., $14°$ C., $15°$ C., $16°$ C., $17°$ C., $18°$ C., $19°$ C., or about $20°$ C. between peak heating and peak cooling. A PCM may limit the interior temperature differential between peak heating and peak cooling in a range from about $1°$ C. to about $2°$ C., about $1°$ C. to about $5°$ C., about $1°$ C. to about $10°$ C., about $1°$ C. to about $15°$ C., about $1°$ C. to about $20°$ C., about $2°$ C. to about $5°$ C., about $2°$ C. to about $10°$ C., about $2°$ C. to about $15°$ C., about $2°$ C. to about $20°$ C., about $5°$ C. to about $10°$ C., about $5°$ C. to about $15°$ C., about $5°$ C. to about $20°$ C., about $10°$ C. to about $15°$ C., about $10°$ C. to about $20°$ C., or about $15°$ C. to about $20°$ C.

Insulation

In some cases, the ESP may include an insulation layer or filling 107 as shown in FIGS. 2, 9A-9C, and 20. In some cases, the insulation layer may include foam, for example, all-purpose foam that can be extruded polystyrene. For example, the insulation layer may include XPS Insulation FOAMULAR 150. The insulation layer may include rigid or non-flexible foam. The insulation layer may be configured to provide stiffness to the ESP and additional insulation of R-10 value. R-value can be a measurement of thermal resistance and measures the ability of heat to transfer from one side of an object to another. As a benchmark, one inch of solid wood has an R-value of R-1. Additionally, the insulation may help to secure the PCM material layer 106 against the solar thermal panel layer 105, especially when the PCM transforms into a fluid state.

Insulation may be chosen from any suitable insulating material. Insulating materials may include foams, wools, resins, sheets, paneling, batting, loose-fills, and glasses. Insulating materials may include vacuum-insulated paneling, silica aerogels, polyurethane rigid paneling, foil-faced polyurethane paneling, polyisocyanurate rigid paneling, polyisocyanurate spray foam, polyurethane spray foam, phenolic spray foam, polystyrene paneling, fiberglass batting, cardboard, cellulose loose-fil, polyethylene foam, perlite loose fill, vermiculite, and refractory materials.

In some cases, the insulation layer 107 in the ESP is not intended or configured to be used as Structural Insulated Panel (SIP). The insulation layer 107 may be configured primarily for supporting and/or enclosing the components within the ESP.

In some cases, the insulation layer may help retard the transmission of water vapor and moisture through the ESP. The insulation layer may help prevent structural damages to the ESP, and also the wall and/ceilings in proximity to the ESP.

Shielding

In some cases, the ESP may include a shielding layer 108 as shown in FIGS. 2, 10A-10C, and 21. In some cases, the shielding layer may be adjacent to the oriented strand board (OSB) layer 109. The shielding layer can be used for shielding electromagnetic waves (e.g. radio frequency waves), electromagnetic field(s), magnetic field(s), electrical field(s), or other types of radiative energy. The electromagnetic waves or other radiative energy may be of various frequencies. Such shielding layer may be grounded. In some cases, the shielding fabric may provide shielding from radiative sources including but not limited to cell towers, cordless phones, high voltage lines, security systems, wireless routers, etc. Such sources may be external to the building, internal to the building but external to one or more specific rooms. As an example, the shielding effectiveness of the layer may be of 99.99% of 40 dB at 1000 MHz. In some cases, a shielding layer may be used for shielding noise or vibration. Noise or vibration sources may be external to the building or structure, or internal to the building or structure but external to one or more specific rooms.

A shielding layer may have a characteristic radiation attenuation. A shielding layer may attenuate about 95%, 96%, 97%, 98%, 99%, 99.5%, 99.9%, 99.99%, or about 99.999% of transmitting radiation. A shielding layer may attenuate at least about 95%, 96%, 97%, 98%, 99%, 99.5%, 99.9%, 99.99%, or about 99.999% of transmitting radiation. A shielding layer may have its characteristic radiation attenuation rated against a particular intensity level (e.g. W, $W/m^2$, or Pa). The intensity level at which an attenuation level is achieved may be expressed as a decibel level. A shielding layer may achieve a characteristic level of attenuation at about 1 decibel (dB), 5 dB, 10 dB, 20 dB, 30 dB, 40 dB, 50 dB, 60 dB, 70 dB, 80 dB, 90 dB, 100 dB, 120 dB, 150 dB, or about 200 dB or greater. A shielding layer may achieve a characteristic level of attenuation at least about 1 decibel (dB), 5 dB, 10 dB, 20 dB, 30 dB, 40 dB, 50 dB, 60 dB, 70 dB, 80 dB, 90 dB, 100 dB, 120 dB, 150 dB, or about 200 dB or greater. A shielding layer may achieve a characteristic attenuation level in an intensity range from about 1 dB to about 10 dB, about 1 dB to about 20 dB, about 1 dB to about 40 dB, about 1 dB to about 60 dB, about 1 dB to about 80 dB, about 1 dB to about 100 dB, about 1 dB to about 200 dB, about 10 dB to about 20 dB, about 10 dB to about 40 dB, about 10 dB to about 60 dB, about 10 dB to about 80 dB, about 10 dB to about 100 dB, about 10 dB to about 200 dB, about 20 dB to about 40 dB, about 20 dB to about 60 dB, about 20 dB to about 80 dB, about 20 dB to about 100 dB, about 20 dB to about 200 dB, about 40 dB to about 60 dB, about 40 dB to about 80 dB, about 40 dB to about 100 dB, about 40 dB to about 200 dB, about 60 dB to about 80 dB, about 60 dB to about 100 dB, about 60 dB to about 200 dB, about 80 dB to about 100 dB, about 80 dB to about 200 dB, or about 100 dB to about 200 dB. A shielding layer may be tuned to absorb radiation at a particular frequency or in a particular frequency band. A shielding layer may protect against radiation in the radio, microwave, infrared, visible, ultraviolet, x-ray, or gamma bands. A shielding layer may contain multiple materials or structures to protect against more than one band of radiation. A shielding layer may have a characteristic absorption frequency of about $10^2$ Hertz (Hz), $10^4$ Hz, $10^6$ Hz, $10^8$ Hz, $10^{10}$ Hz, $10^{12}$ Hz, $10^{14}$ Hz, $10^{16}$ Hz, $10^{18}$ Hz, $10^{20}$ Hz, $10^{22}$ Hz, or about $10^{24}$ Hz. A shielding layer may have a characteristic absorption frequency of at least about $10^2$ Hertz (Hz), $10^4$ Hz, $10^6$ Hz, $10^8$ Hz, $10^{10}$ Hz, $10^{12}$ Hz, $10^{14}$ Hz, $10^{16}$ Hz, $10^{18}$ Hz, $10^{20}$ Hz, $10^{22}$ Hz, or about $10^{24}$ Hz. A shielding layer may have a characteristic absorption frequency of no greater than about $10^{24}$ Hz, $10^{22}$ Hz, $10^{20}$ Hz, $10^{18}$ Hz, $10^{16}$ Hz, $10^{14}$ Hz, $10^{12}$ Hz, $10^{10}$ Hz, $10^8$ Hz, $10^6$ Hz, $10^4$ Hz, or about $10^2$ Hz. A shielding layer may have an absorption band in a range from about $10^2$ Hz to about $10^4$ Hz, about $10^2$ Hz to about $10^8$ Hz, about $10^2$ Hz to about $10^{12}$ Hz, about $10^2$ Hz to about $10^{16}$ Hz, about $10^2$ Hz to about $10^{20}$ Hz, about $10^2$ Hz to about $10^{24}$ Hz, about $10^4$ Hz to about $10^8$ Hz, about $10^4$ Hz to about $10^{12}$ Hz, about $10^4$ Hz to about $10^{16}$ Hz, about $10^4$ Hz to about $10^{20}$ Hz, about $10^4$ Hz to about $10^{24}$ Hz, about $10^8$ Hz to about $10^{12}$ Hz, about $10^8$ Hz to about $10^{16}$ Hz, about $10^8$ Hz to about $10^{20}$ Hz, about $10^8$ Hz to about $10^{24}$ Hz, about $10^{12}$ Hz to about $10^{16}$ Hz, about $10^{12}$ Hz to about $10^{20}$ Hz, about $10^{12}$ Hz to about $10^{24}$ Hz, about $10^{16}$ Hz to about $10^{20}$ Hz, about $10^{16}$ Hz to about $10^{24}$ Hz, or about $10^{20}$ Hz to about $10^{24}$ Hz. In some cases, the shielding layer may include fabric as shown in FIGS. 8A-8C, for example, with a weave pattern. In some cases, the shield layer may include one or more types of metal, such as copper or nickel, or metal alloy. In some cases, the shielding layer may include permalloy and mu-metal, or with nanocrystalline grain structure ferromagnetic metal coatings.

As shown in FIGS. 10A-10C, the shielding layer may occupy at least part of the surface area of the ESP. In some cases, the total surface area of the shielding layer may occupy an area that is less than or equal to the surface area of the ESP along the x-y plane. In some cases, the shielding layer may include a thickness along the z axis in the range of about 0.01 inches to about 2 inches.

Oriented Strand Board

In some cases, the ESP may include a layer of oriented strand board (OSB) as shown in FIGS. 2 and 11. The OSB layer may include engineered wood panel(s) or plywood panel(s). In some cases, the OSB layer includes recycled wood that is compressed under pressure and bond together, for example by using adhesive.

The OSB layer can be configured to provide structural strength to the ESP.

As shown in FIGS. 11A-11C, the OSB layer may occupy at least part of the surface area of the ESP. In some cases, the total surface area of the OSB layer may occupy an area that is less than or equal to the surface area of the ESP along the x-y plane. In some cases, the OSB layer may include a thickness along the z axis in the range of about 0.1 cm to about 50 cm.

Barrier

In some cases, the ESP may include a barrier layer 110 as shown in FIGS. 2, 12A-12C, and 22. In some cases, the barrier layer 110 may be adjacent to the OSB layer as shown in FIG. 2. The barrier layer may be self-adhesive so that it can be attached to the OSB layer. The barrier layer may be an air and vapor barrier membrane that is impermeable to air, moisture, liquid water, water vapor, or other gaseous or liquid fluids. The barrier layer may be impermeable uni-directionally or bi-directionally. In some cases, the barrier layer may include rubberized asphalt compound optionally laminated on polyethylene film.

A moisture or vapor barrier may be defined by a water flux or permeance. A barrier layer may have a water permeance of about 1 nanogram per Pascal per second per square meter $(ng/(Pa*s*m^2))$, 5 $ng/(Pa*s*m^2)$, 10 $ng/(Pa*s*m^2)$, 50 $ng/(Pa*s*m^2)$, 100 $ng/(Pa*s*m^2)$, 150 $ng/(Pa*s*m^2)$, 200 $ng/(Pa*s*m^2)$, 250 $ng/(Pa*s*m^2)$, or about 300 $ng/(Pa*s*m^2)$. A barrier layer may have a water permeance of at least about 1 nanogram per Pascal per second per square meter $(ng/(Pa*s*m^2))$, 5 $ng/(Pa*s*m^2)$, 10 $ng/(Pa*s*m^2)$, 50 $ng/(Pa*s*m^2)$, 100 $ng/(Pa*s*m^2)$, 150 $ng/(Pa*s*m^2)$, 200 $ng/(Pa*s*m^2)$, 250 $ng/(Pa*s*m^2)$, or about 300 $ng/(Pa*s*m^2)$. A barrier layer may have a water permeance of no greater than about 300 $ng/(Pa*s*m^2)$, 250 $ng/(Pa*s*m^2)$, 200 $ng/(Pa*s*m^2)$, 150 $ng/(Pa*s*m^2)$, 100 $ng/(Pa*s*m^2)$, 50 $ng/(Pa*s*m^2)$, 10 $ng/(Pa*s*m^2)$, 5 $ng/(Pa*s*m^2)$, or about 1 $ng/(Pa*s*m^2)$. A barrier material may have a water permeance in a range from about 1 $ng/(Pa*s*m^2)$ to about 10 $ng/(Pa*s*m^2)$, about 1 $ng/(Pa*s*m^2)$ to about 50 $ng/(Pa*s*m^2)$, about 1 $ng/(Pa*s*m^2)$ to about 100 $ng/(Pa*s*m^2)$, about 1 $ng/(Pa*s*m^2)$ to about 150 $ng/(Pa*s*m^2)$, about 1 $ng/(Pa*s*m^2)$ to about 200 $ng/(Pa*s*m^2)$, about 1 $ng/(Pa*s*m^2)$ to about 250 $ng/(Pa*s*m^2)$, about 1 $ng/(Pa*s*m^2)$ to about 300 $ng/(Pa*s*m^2)$, about 10 $ng/(Pa*s*m^2)$ to about 50 $ng/(Pa*s*m^2)$, about 10 $ng/(Pa*s*m^2)$ to about 100 $ng/(Pa*s*m^2)$, about 10 $ng/(Pa*s*m^2)$ to about 150 $ng/(Pa*s*m^2)$, about 10 $ng/(Pa*s*m^2)$ to about 200 $ng/(Pa*s*m^2)$, about 10 $ng/(Pa*s*m^2)$ to about 250 $ng/(Pa*s*m^2)$, about 10 $ng/(Pa*s*m^2)$ to about 300 $ng/(Pa*s*m^2)$, about 50 $ng/(Pa*s*m^2)$ to about 100 $ng/(Pa*s*m^2)$, about 50 $ng/(Pa*s*m^2)$ to about 150 $ng/(Pa*s*m^2)$, about 50 $ng/(Pa*s*m^2)$ to about 200 $ng/(Pa*s*m^2)$, about 50 $ng/(Pa*s*m^2)$ to about 250 $ng/(Pa*s*m^2)$, about 50 $ng/(Pa*s*m^2)$ to about 300 $ng/(Pa*s*m^2)$, about 100 $ng/(Pa*s*m^2)$ to about 150 $ng/(Pa*s*m^2)$, about 100 $ng/(Pa*s*m^2)$ to about 200 $ng/(Pa*s*m^2)$, about 100 $ng/(Pa*s*m^2)$ to about 250 $ng/(Pa*s*m^2)$, about 100 $ng/(Pa*s*m^2)$ to about 300 $ng/(Pa*s*m^2)$, about 150 $ng/(Pa*s*m^2)$ to about 200 $ng/(Pa*s*m^2)$, about 150 $ng/(Pa*s*m^2)$ to about 250 $ng/(Pa*s*m^2)$, about 150 $ng/(Pa*s*m^2)$ to about 300 $ng/(Pa*s*m^2)$, about 200 $ng/(Pa*s*m^2)$ to about 250 $ng/(Pa*s*m^2)$, about 200 $ng/(Pa*s*m^2)$ to about 300 $ng/(Pa*s*m^2)$, or about 250 $ng/(Pa*s*m^2)$ to about 300 $ng/(Pa*s*m^2)$.

In some cases, the barrier layer may allow the ESP panel to be air sealing and/or vapor sealing.

Other Materials

An ESP may contain any other material necessary to complete its construction and assembly. Other materials may be incorporated into an ESP for any purpose, including joining ESP components, joining multiple ESPs together, sealing gaps, waterproofing, windproofing, insulating, reducing weight, increasing weight, increasing weight, increasing strength, increasing rigidity, increasing flexibility, decreasing flexibility, or providing any other necessary property or utility to an ESP.

An ESP may include one or more types of fastening elements. Fastening elements may include screws, bolts, nails, rivets, and staples. Screws may include flathead, finish, round, oval, washer, or pan screws. Screws may be slotted, Phillips, square, hex, or star drives. Screws may be tapered or have straight roots. Screws may be include drywall, wood, metal, or plastic screws. A screw may be made of any material, including galvanized steel, stainless steel, and plastic. A screw may be recessed, flush, or extended above the surface of a panel. Nails may include common nails, finishing nails, box nails, roofing nails, masonry nails, double-headed nails, drywall nails, annular ring shank nails, casing nails, brad nails, glazing sprigs, cap nails, upholstery nails, carpet nails, or corrugated nails. Nails may be driven manually or pneumatically. An ESP may include plates, brackets, shims, or other pieces that secure or position pieces together. Joining elements may be metal, plastic, or wood.

An ESP may include other materials such as glues, adhesives, resins, epoxies, fills, fibers, caulks, sealants, paints, primers, stains, anti-microbial compounds, antifungal compounds, fire retardants, flashing, weather strippings, grouts, cements, veneers, spackles, and putties. Such materials may be incorporated on internal or external portions of an ESP. An ESP may include aesthetic materials on non-functional surfaces. In some cases, an exterior surface may include paints, sidings, or other finishing materials such as stucco. In other cases, an interior surface may include paints, wall papering, casing, paneling, or texturing materials.

Sensors

In some cases, the ESP may be a self-sufficient integrated panel with multiple layers of materials integrated with specific order(s) that result in a highly efficient energy saving panel. In some embodiments, the ESP may include one or more sensors 111 connected to a control system or the Internet-of-Things (IOT). The ESP may be an IOT node that can be connected to the IOT and/or controlled and regulated by the controller(s) connected to the IOT. In some cases, one or more sensors may be integrated in or on one or more layers of the ESP. In some cases, one or more sensors may be integrated in between two adjacent layers of the ESP.

The ESP may include one or more sensors at one or more layers. An exemplary position of a sensor is shown in FIG. 2. The sensor(s) may also locate at the exterior side or any other layer of the ESP along the z-axis. Additionally, the sensor(s) may locate at any position at the entire surface area within the x-y plane. In some cases, the spatial distribution of the sensor(s) may enable accurate and convenient detection of heating or cooling status within the interior of a building, or more specifically, within one or more rooms of a building. For example, traditional heating with water, oil, or air may overheat certain areas of the building while leaving some other areas of the building cold, thus wasting energy during heating or cooling. Sensors may be placed in specific positions close to the hot and cold spots within the building so as to accurately monitor temperature information of local regions. This may facilitate heating and cooling using different areas of the ESP based on local temperature information of regions. In some cases, the location of one or more sensors may facilitate sensing of environmental characteristics/data in its vicinity, thus facilitating the generation of sensor data. Such environmental characteristics may include the level of parameters such as smoke, carbon monoxide, carbon dioxide, radioactivity, humidity, chemical, PM 2.5, etc. In some cases, the sensor data may comprise one or more of temperature, pressure, air flow, amount of ambient light in the vicinity of the sensor, amplitude and frequency variations of sound vibrations in the vicinity of the sensor, electromagnetic field variations, and other environmental parameters sensed by the sensor.

As used herein, "sensor data" refers to information obtained or provided by one or more sensors. In some cases, a sensor and/or sensor device comprises an acoustic sensor, a hygrometer, a carbon dioxide sensor, a carbon monoxide sensor, an infrared sensor, an oxygen sensor, an ozone monitor, a pH sensor, a smoke detector, a current sensor (e.g. detects electric current in a wire), a magnetometer, a metal detector, a radio direction finder, a voltage detector, an air flow meter, an anemometer, a flow sensor, a gas meter, a water meter, a Geiger counter, an altimeter, an air speed indicator, a depth gauge, a gyroscope, a compass, an odometer, a shock detector (e.g. on a football helmet to measure impact), a barometer, a pressure gauge, a thermometer, a proximity sensor, a motion detector (e.g. in a home security system), an occupancy sensor, or any combination thereof, and in some embodiments, sensor data comprises information obtained from any of the preceding sensors.

Sensors may be connected to each other or remote controllers via telecommunication systems. Telecommunications may be performed via wired or wireless connections.

Telecommunications wiring may pass through void spaces 123 in an ESP. Passages for sensors or telecommunication wiring may be made in a transverse fashion to the void spaces. In some cases, one or more sensors are physically separate from a user device or controller that controls or monitors the ESP. In some cases, the one or more sensors authorize the user device to obtain sensor data. In some cases, the one or more sensors provide or send sensor data to the user device autonomously.

In some cases, one or more sensors herein include a sensing component, microcontroller (MCU), microprocessor (MPU), an electrical circuit, a software module, an application, and/or the like that monitors functionalities, controls functionalities, and/or tracks location and status of the sensor(s) and/or ESP. In some embodiments, the sensing component, MCU, MPU, an electrical circuit, a software module, an application, and/or the like are embedded in the sensors, or ESP. In some embodiments, data are generated from the sensing component sensing factors external to the sensors, or ESP. As an example, humidity data may be generated from a humidity sensor indicating the humidity level in the interior of the building that is not in the ESP but within the spatial sensing radius of the sensor.

In some cases, the user device or controller that controls or monitors the sensor and/or ESP includes a digital processing device, a processor, a software module, a computer program, an application, or the like.

Integration and Assembly

An ESP may be assembled in many different configurations depending upon the desired performance characteristics of the panel. For example, an ESP for external portions of a building or structure may have a different order and manner of assembly than an ESP intended for internal walls. The ESP disclosed herein may include various combinations of different layers to achieve the highest R-Value, e.g., R-30, R-45, or R-49 for the insulation and reduce the energy consumption and associated cost.

In some cases, an ESP may be fabricated in place during the construction of a building or structure. Steps involved in fabrication may include framing in the wall, installing structural wall components (e.g. concrete sections), installing non-structural wall components (e.g. electrical wiring, sensors, and plumbing), securing layered materials (e.g. drywall) to the framing, installing solar thermal panels, establishing connectivity between solar thermal panels and HVAC systems or sensor systems, filling void spaces with insulating materials (e.g. rigid polystyrene foam), sealing or finishing panel sections, and connecting or otherwise securing neighboring ESPs to each other to form larger structures.

Figure 16:
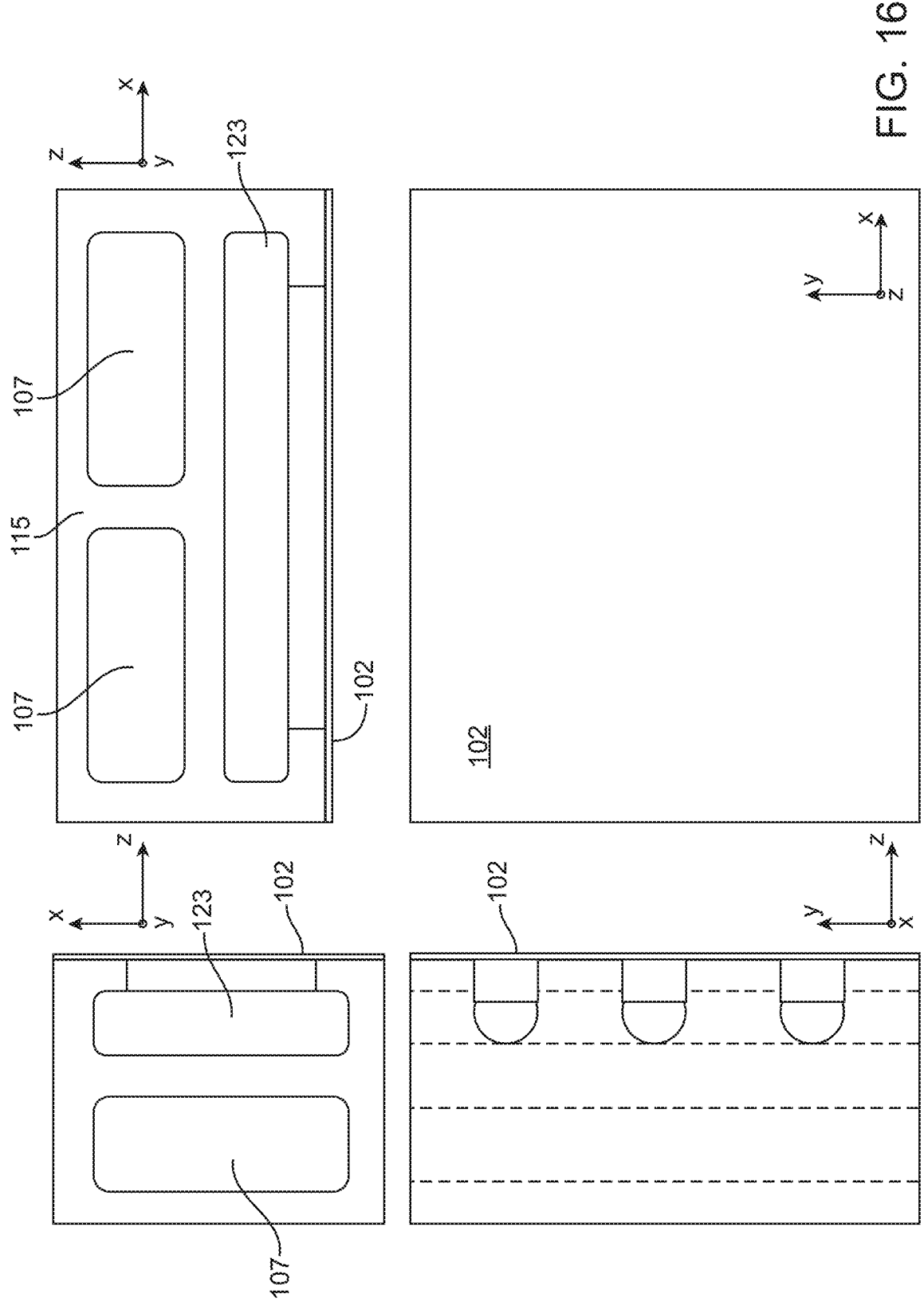
FIG. 16 shows a schematic view of an embodiment of an ESP with a metal foil layer mounted to a structural component.
Figure 17:
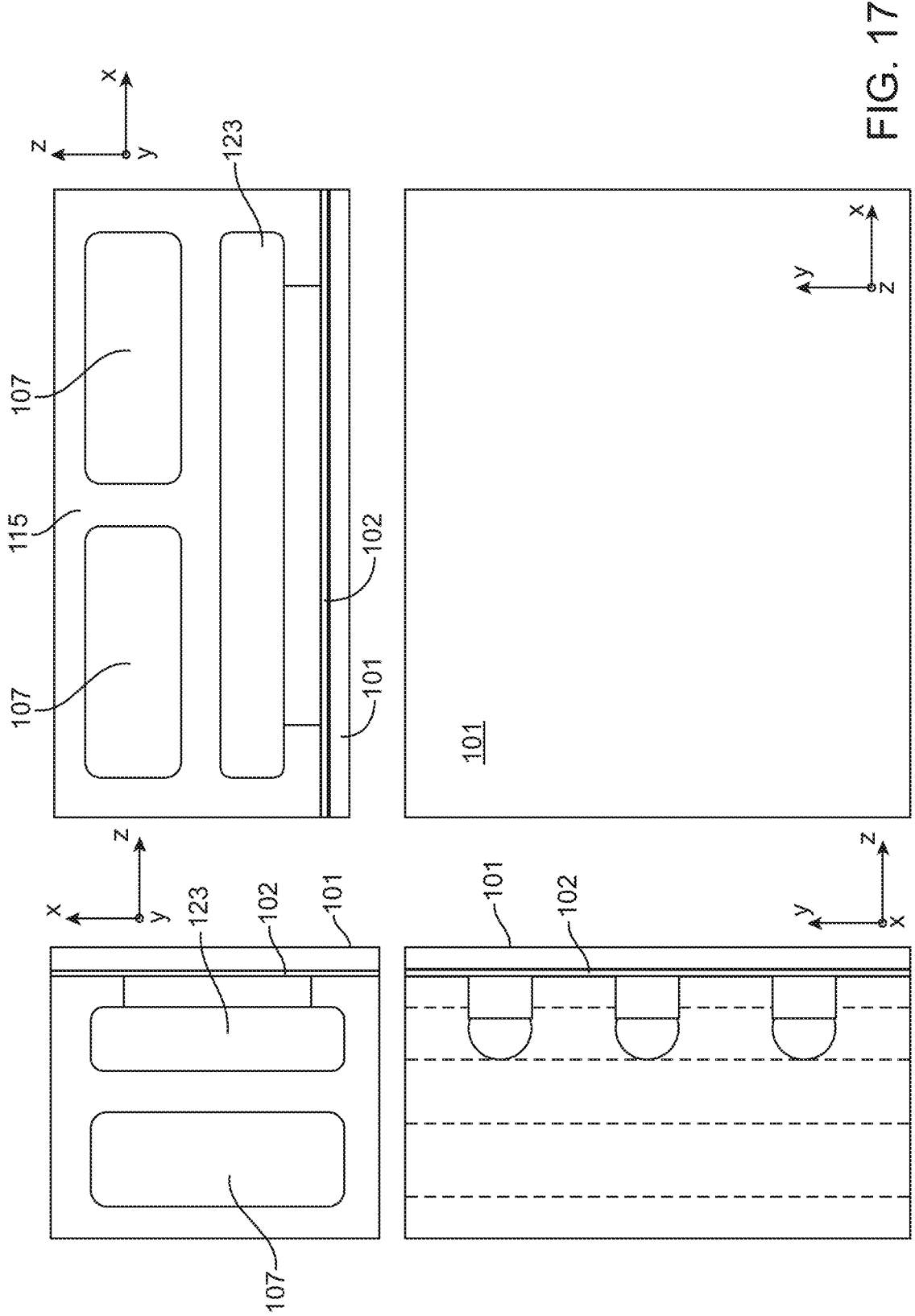
FIG. 17 illustrates a schematic view of an embodiment of an ESP with a drywall layer mounted against a metal foil layer.
Figure 18:
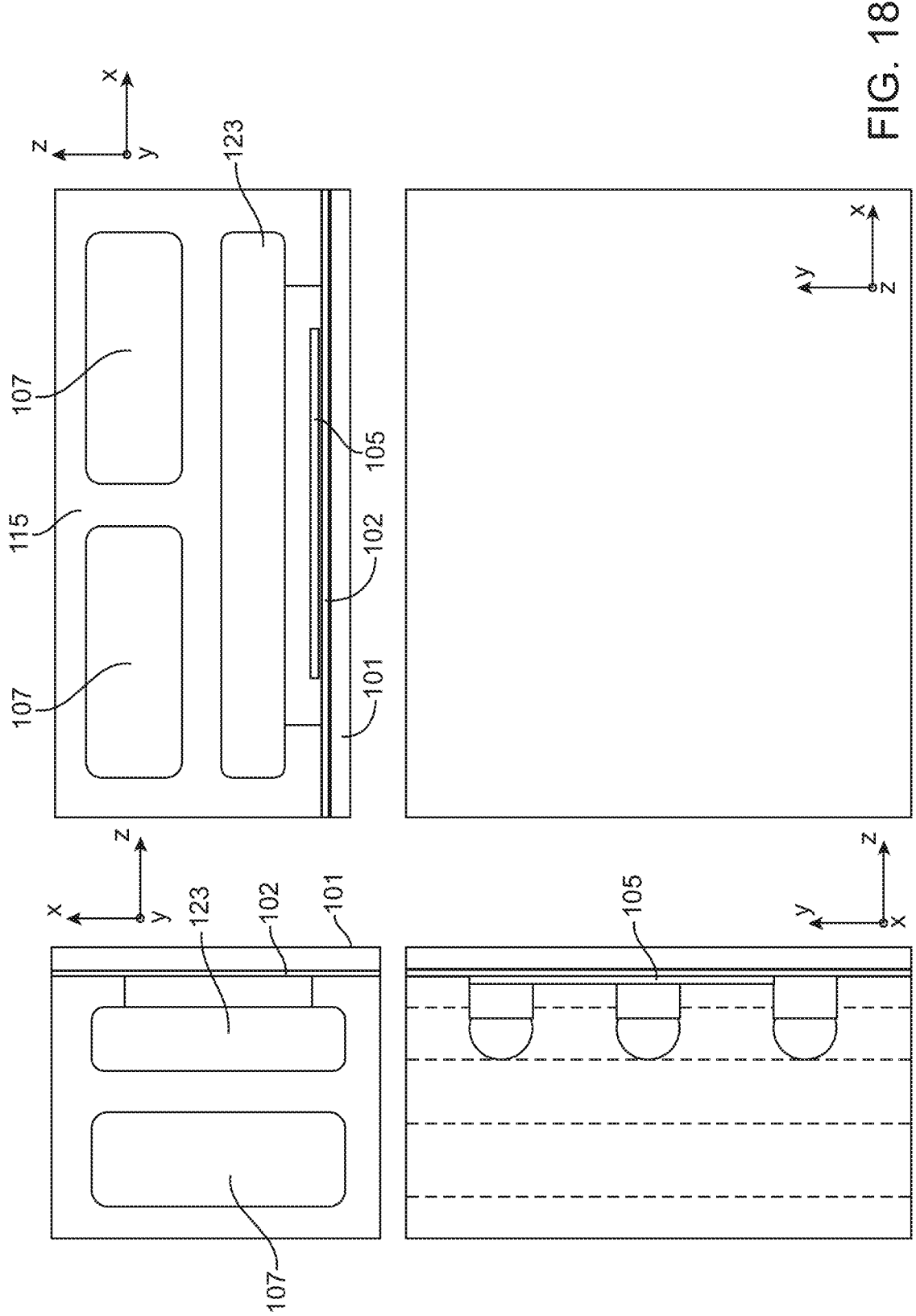
FIG. 18 depicts a schematic view of an embodiment of an ESP with a solar thermal panel mounted against the back of the metal foil layer.
Figure 19:
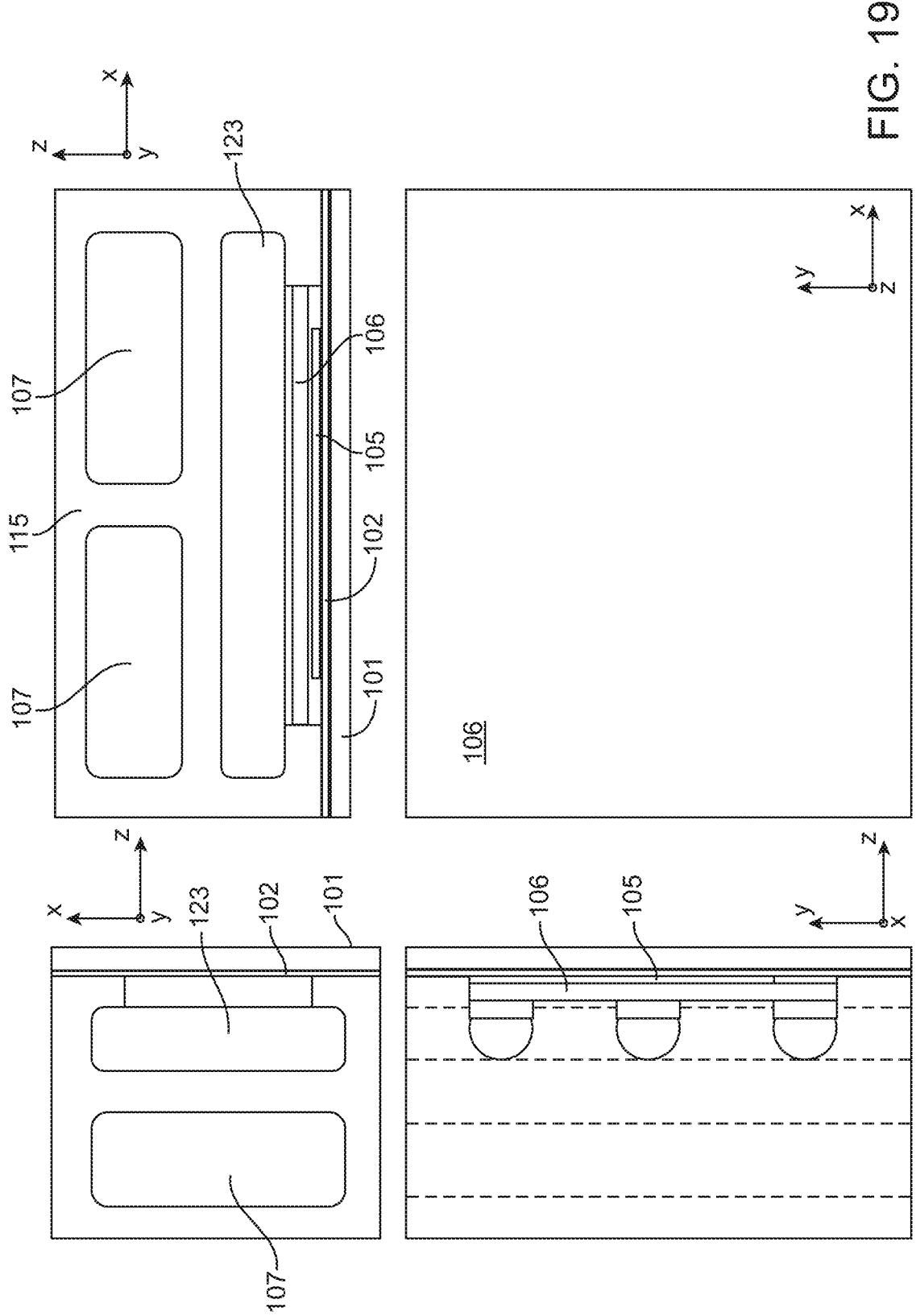
FIG. 19 shows a schematic view of an embodiment of an ESP with a phase change material mounted behind a solar thermal panel.
Figure 20:
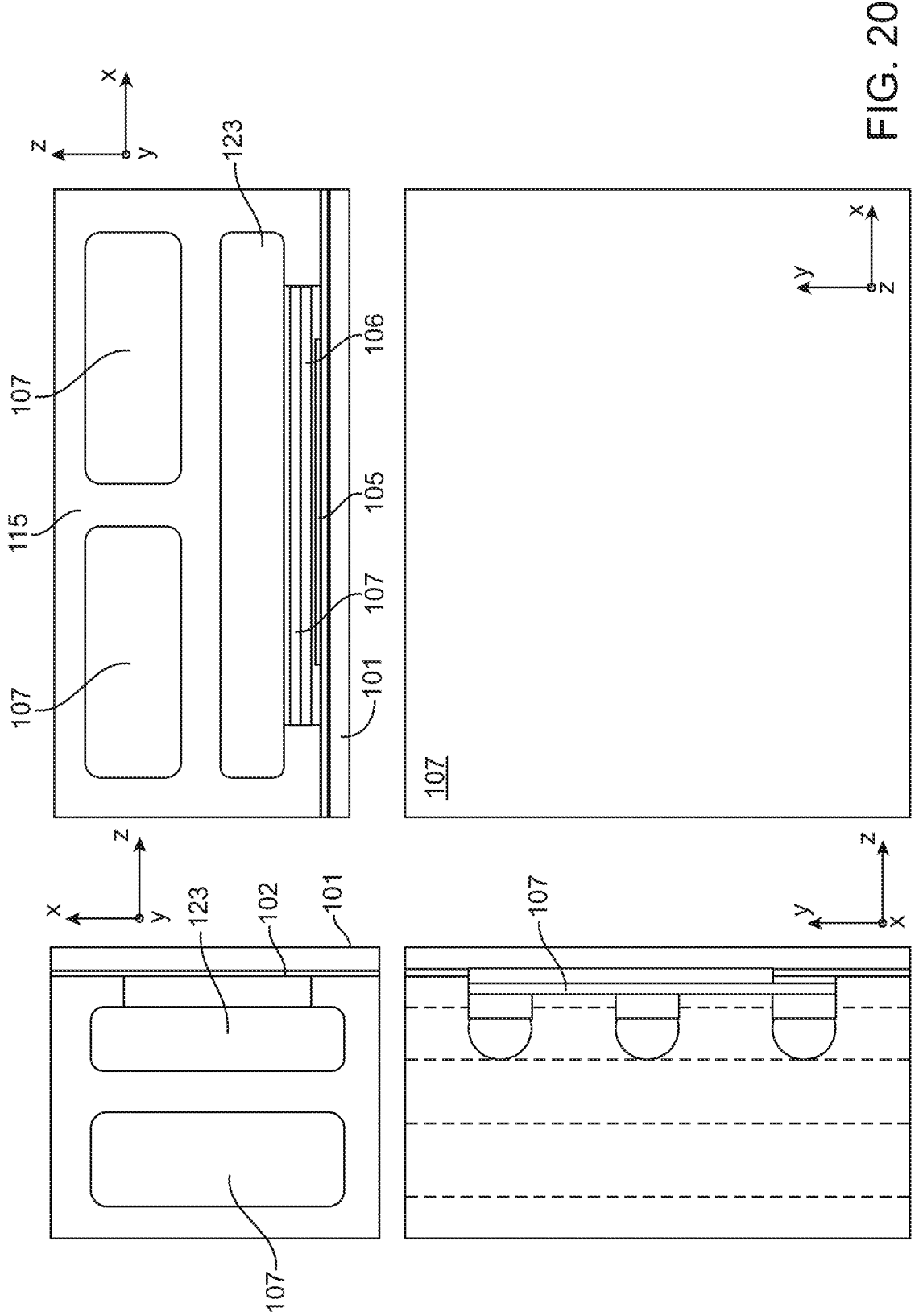
FIG. 20 illustrates a schematic view of an embodiment of an ESP with insulation mounted behind a phase change material layer.
Figure 21:
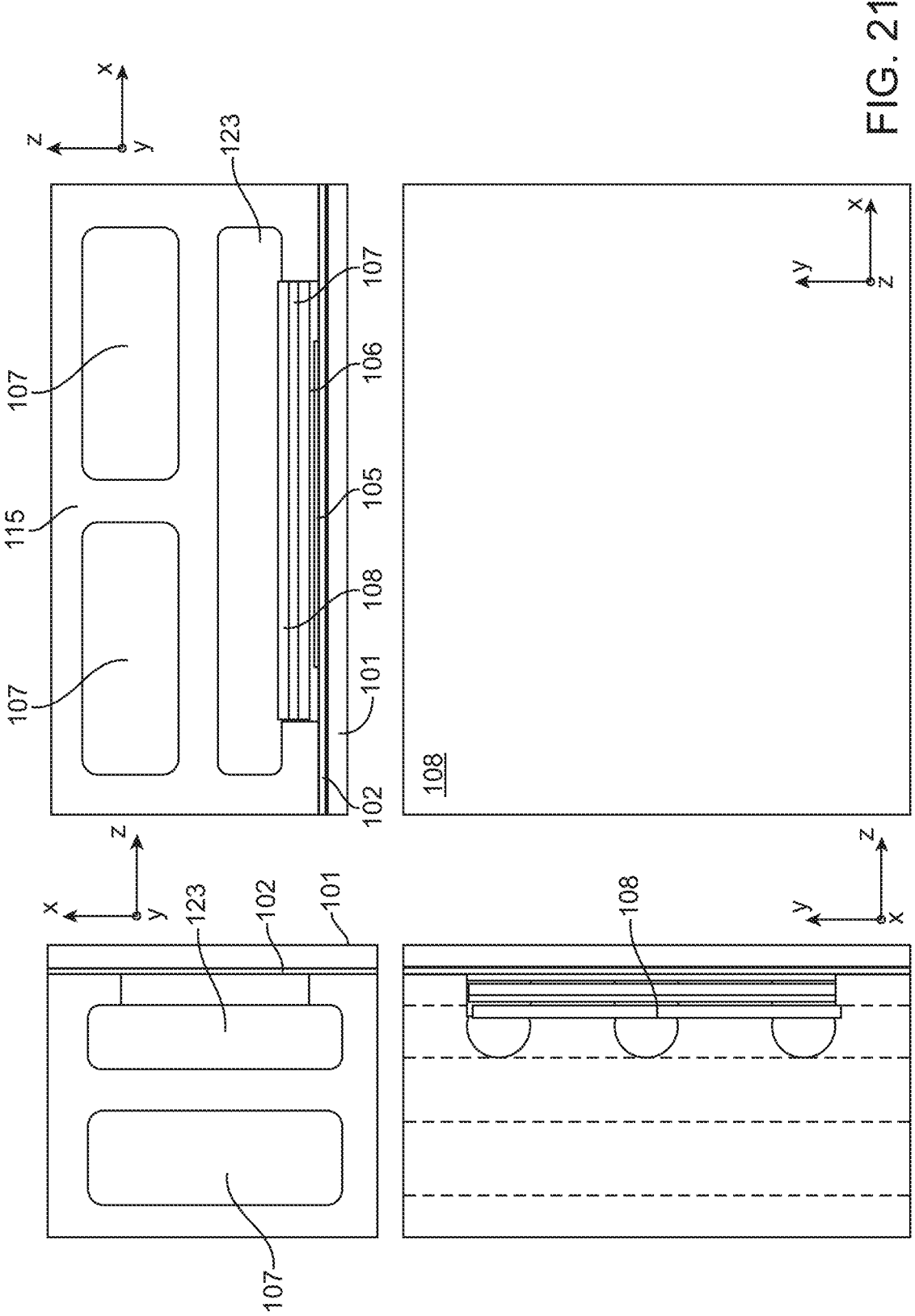
FIG. 21 depicts a schematic view of an embodiment of an ESP with a shielding layer providing isolation from electromagnetic radiation or other internal or external phenomena.
Figure 22:
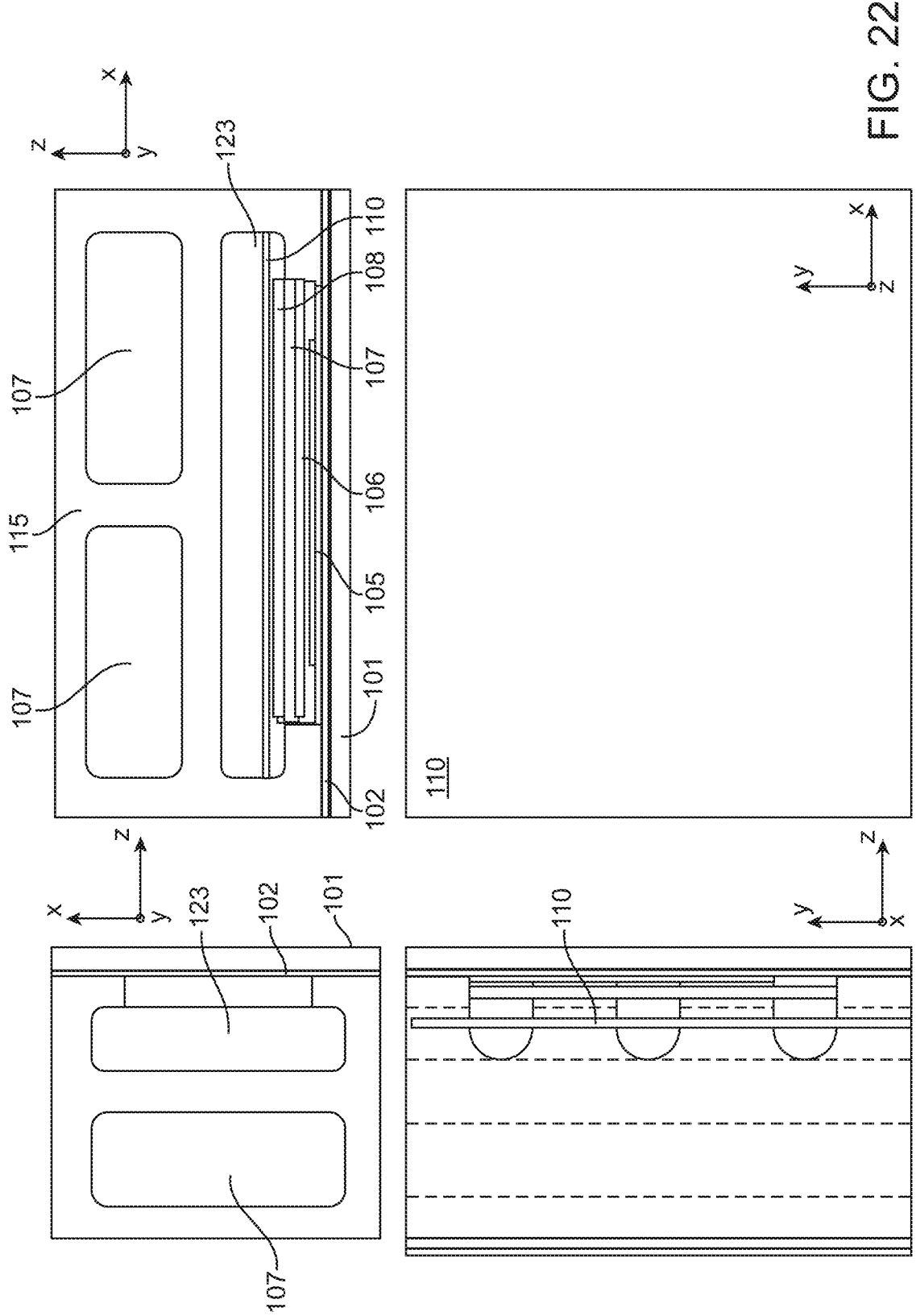
FIG. 22 illustrates a schematic view of an embodiment of an ESP with a barrier material to prevent moisture or gas flow from a void space.
Figure 23:
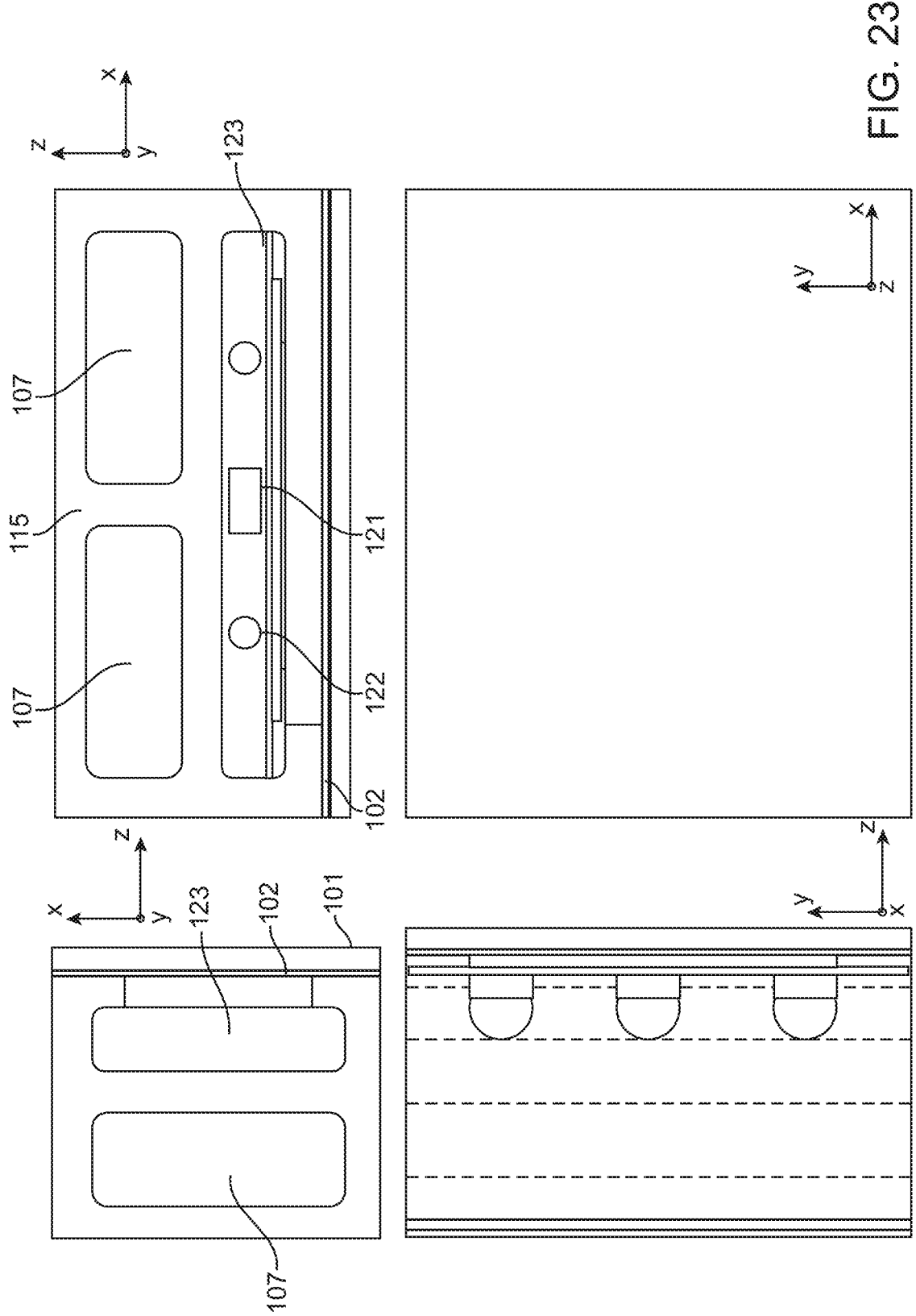
FIG. 23 shows a schematic view of an embodiment of an ESP with electrical and plumbing connections in a void space within the panel.

FIGS. 16-23 depict a particular embodiment of an ESP and highlight a method of assembling a modular ESP. As shown in FIG. 16, a modular ESP may be assembled from an initial structure 115. The structure 115 may comprise wood studs, concrete, or any other material that provides the overall shape to the ESP. A face of the structure 115 may have a metal foil layer 102 attached to it by any means of attachment described elsewhere herein. As shown in FIG. 17, a drywall panel 101 may be connected to the face by a means of attachment after placement of the metal foil layer 102. After the drywall is placed, a solar thermal panel 105 may be installed in a void space 123, as shown in FIG. 18. As shown in FIG. 19, a phase change material 106 may be installed behind the solar thermal panel. The phase change material 106 may contact the solar thermal panel 105 or have a gap that separates it. As shown in FIG. 20, a layer of insulation 107 may be installed in the void space behind the phase change material. The insulation 107 may occupy some or all of the void space 123. As shown in FIG. 21, a layer of shielding 108 (e.g. electromagnetic shielding) may be installed behind an insulation layer 107. The shielding may not directly contact the insulation layer or other layers. The layering of an ESP may be finalized by installing a barrier material 110 (e.g. a water vapor barrier) in the void space 123 as shown in FIG. 22. The vapor barrier 110 may form a water-tight or air-tight seal within the void space 123. As shown in FIG. 23, an ESP may be finalized by installing plumbing components 121 or electrical components 122 in the void space 123.

In some cases, ESPs may be partially or completely fabricated in a factory or other assembly site. ESPs may be transported to a building site where they are assembled into a final structure or building. ESPs may be capable of transport or various means of transportation, including flatbed trailers, pickup trucks, trains, cargo containers, sea vessels, and aircraft. ESPs may be designed to fit together in a modular fashion. Many pre-fabricated ESPs may be assembled into a structure or building. Modular, pre-fabricated ESPs may utilize flat, vertical ESPs to create walls and specialized connecting ESPs to create corners when constructing rooms. FIG. 1 shows a top-down cross-sectional view of a hypothetical room incorporating multiple styles of connecting ESPs. Connecting ESPs might include tee sections 170, L-corners, or angled corners 150.

The use of pre-fabricated ESPs may speed the construction of a building or structure. A building or structure assembled from pre-fabricated ESPs may be assembled in 1 day, 2 days, 3 days, 4 days, 5 days, 6 days, 7 days, 10 days, 2 weeks, 3 weeks, 4 weeks, 1 month, 2 months, 3 months, 4 months, 5 months, or 6 months. A building or structure configured from ESPs may be assembled in no greater than 6 months, 5 months, 4 months, 3 months, 2 months, 1 month, 4 weeks, 3 weeks, 2 weeks, 10 days, 7 days, 6 days, 5 days, 4 days, 3 days, 2 days, or 1 day. The construction time of a building or structure assembled with ESPs may be reduced by up to 10%, 20%, 30%, 40%, 50%, 60%, 70%, 80%, or 90%.

In some cases, the metal foil may be attached to the drywall layer, the stud frame, the solar thermal panel, or a combination thereof. In some cases, the stud frame may be fixed to the drywall layer, the metal foil, or both. In some embodiments, the one or more solar thermal panels may be at least partially attached to one or more of the stud frame, the metal foil layer, or both. In some embodiments, the one or more enclosures may be at least partially attached to the one or more solar thermal panels, the stud frame, or both. In some cases, the foam layer may be at least partially attached to the one or more enclosures, the stud frame, or both.

In some cases, the adjacent layers of the ESP may be attached to each other to improve the strength and structural integrity of the ESP. In some cases, a layer of the ESP may be attached to one, two, three, or more layers that the layer is adjacent to.

In some cases, the attachment herein may use screws, adhesive, or any other mechanical/chemical fastening elements and/or methods.

In some cases, an existing building or structure may be renovated to include one or more ESPs. A renovated building or structure that includes ESPs may have an improved energy efficiency or other improved characteristics compared to the unrenovated building or structure. In other cases, a building or structure may be expanded to include additional space that comprises one or more ESPs. An expanded building or structure with one or more ESPs may have an improved energy efficiency or other improved characteristics compared to the unexpanded building or structure.

Although certain embodiments and examples are provided in the foregoing description, the inventive subject matter extends beyond the specifically disclosed embodiments to other alternative embodiments and/or uses, and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components.

For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

As used herein A and/or B encompasses one or more of A or B, and combinations thereof such as A and B. It will be understood that although the terms "first," "second," "third" etc. may be used herein to describe various elements, components, regions and/or sections, these elements, components, regions and/or sections should not be limited by these terms. These terms are merely used to distinguish one element, component, region or section from another element, component, region or section. Thus, a first element, component, region or section discussed below could be termed a second element, component, region or section without departing from the teachings of the present disclosure.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will be further understood that the terms "comprises" and/or "comprising," or "includes" and/or "including," when used in this specification, specify the presence of stated features, regions, integers, steps, operations, elements and/or components, but do not preclude the presence or addition of one or more other features, regions, integers, steps, operations, elements, components and/or groups thereof.

Furthermore, relative terms, such as "lower" or "bottom" and "upper" or "top" may be used herein to describe one element's relationship to other elements as illustrated in the figures. It will be understood that relative terms are intended to encompass different orientations of the elements in addition to the orientation depicted in the figures. For example, if the element in one of the figures is turned over, elements described as being on the "lower" side of other elements would then be oriented on the "upper" side of the other elements. The exemplary term "lower" can, therefore, encompass both an orientation of "lower" and "upper," depending upon the particular orientation of the figure. Similarly, if the element in one of the figures were turned over, elements described as "below" or "beneath" other elements would then be oriented "above" the other elements. The exemplary terms "below" or "beneath" can, therefore, encompass both an orientation of above and below.

For coordinate systems shown herein, "o" may indicate that the corresponding axis points into the paper, while "." may indicate that the axis points out of the paper.

While preferred embodiments have been shown and described herein, it will be obvious to those skilled in the art that such embodiments are provided by way of example only. Numerous variations, changes, and substitutions will now occur to those skilled in the art without departing from the scope of the disclosure. It should be understood that various alternatives to the embodiments described herein may be employed in practice. Numerous different combinations of embodiments described herein are possible, and such combinations are considered part of the present disclosure. In addition, all features discussed in connection with any one embodiment herein can be readily adapted for use in other embodiments herein. It is intended that the following claims define the scope of the disclosure and that methods and structures within the scope of these claims and their equivalents be covered thereby.

What is claimed is:

1. A modular fabricated panel comprising:
   one or more solar thermal panels;
   a phase change material;
   a wall panel;
   a metal foil layer directly coupled to the wall panel;
   a structural material to which the one or more solar thermal panels are coupled,
   wherein the phase change material and metal foil layer are coupled to the one or more solar thermal panels and disposed on opposite sides of said solar thermal panels, wherein the metal foil layer is disposed between the wall panel and the phase change material, and wherein the modular fabricated panel is configured to be incorporated into a structure to reduce energy consumption of the structure.

2. The modular fabricated panel of claim 1, further comprising at least one or more materials selected from the group consisting of insulating material, vapor barrier material, oriented strand board, and electromagnetic shielding material.

3. The modular fabricated panel of claim 1, further comprising one or more sensors configured to collect environmental data surrounding the fabricated panel.

4. The modular fabricated panel of claim 3, wherein the sensor comprises a temperature sensor, a humidity sensor, an air flow sensor, a pressure sensor, a carbon monoxide sensor, a carbon dioxide sensor, an acoustic sensor, or a vibration sensor.

5. The modular fabricated panel of claim 1, wherein the one or more solar thermal panels are oriented toward an exterior surface of the structure or an interior surface of the structure.

6. The modular fabricated panel of claim 1, wherein the modular fabricated panel is used to form an exterior wall of the structure, an interior wall of the structure, or a ceiling of the structure.

7. The fabricated panel of claim 1, wherein the structural material comprises one or more wood studs of a nominal size selected from the group consisting of 1×2, 1×3, 1×4, 1×6, 1×8, 1×10, 1×12, 2×2, 2×3, 2×4, 2×6, 2×8, 2×10, 2×12, 4×4, 4×6, and 4×8.

8. The modular fabricated panel of claim 1, wherein the structural material comprises concrete with a weight-reducing component.

9. The modular fabricated panel of claim 8, wherein the weight-reducing component comprises fiberglass.

10. The modular fabricated panel of claim 1, wherein the panel has an insulating R-value of at least about 10.

11. The modular fabricated panel of claim 1, wherein the incorporation of the one or more fabricated panels into the structure reduces the total energy consumption of the structure by at least about 10% as compared to another structure that is built without using the modular fabricated panel.

12. The modular fabricated panel of claim 1, further comprising a void space configured to receive a plumbing component, an electrical component, or a telecommunications component.

13. The modular fabricated panel of claim 1, wherein the one or more solar thermal panels is coupled to the structural material by one or more intermediate layers.

14. The modular fabricated panel of claim 1, wherein the metal foil layer is attached to the structural material.

15. The modular fabricated panel of claim 2, wherein the insulating material is in direct contact with the phase change material.

16. The modular fabricated panel of claim 12, wherein the void space is configured to comprise a vapor barrier material that prevents vapor flow through the void space.

17. The modular fabricated panel of claim 1, wherein the metal foil layer is directly coupled to the wall panel without any gap between the metal foil layer and the wall panel.

18. The modular fabricated panel of claim 1, wherein the wall panel is directly coupled to the structural material without any intervening layer.

19. The modular fabricated panel of claim 1, wherein the wall panel comprises a drywall, plasterboard, or gypsum panel.

20. The modular fabricated panel of claim 1, wherein the one or more solar thermal panels are directly coupled to (i) the structural material, (ii) the metal foil layer, and/or (iii) the phase change material.

* * * * *